United States Patent
Jang et al.

(10) Patent No.: US 9,660,782 B2
(45) Date of Patent: May 23, 2017

(54) METHOD AND APPARATUS FOR TRANSCEIVING DOWNLINK CONTROL INFORMATION IN A WIRELESS ACCESS SYSTEM

(71) Applicant: LG ELECTRONICS INC., Seoul (KR)

(72) Inventors: Jiwoong Jang, Anyang-si (KR); Hangyu Cho, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 377 days.

(21) Appl. No.: 14/351,120

(22) PCT Filed: Oct. 19, 2012

(86) PCT No.: PCT/KR2012/008597
§ 371 (c)(1),
(2) Date: Apr. 10, 2014

(87) PCT Pub. No.: WO2013/058599
PCT Pub. Date: Apr. 25, 2013

(65) Prior Publication Data
US 2014/0286281 A1    Sep. 25, 2014

Related U.S. Application Data

(60) Provisional application No. 61/548,733, filed on Oct. 19, 2011.

(51) Int. Cl.
*H04L 5/00* (2006.01)
*H04W 48/02* (2009.01)

(52) U.S. Cl.
CPC .......... *H04L 5/0053* (2013.01); *H04L 5/0028* (2013.01); *H04L 5/0092* (2013.01);
(Continued)

(58) Field of Classification Search
CPC ..................................................... H04L 5/0028
See application file for complete search history.

(56) References Cited

U.S. PATENT DOCUMENTS

| | | | |
|---|---|---|---|
| 9,344,259 B2 * | 5/2016 | Love | H04L 5/003 |
| 2007/0153931 A1 * | 7/2007 | Lee | H04L 27/261 |
| | | | 375/260 |

(Continued)

FOREIGN PATENT DOCUMENTS

| | | |
|---|---|---|
| KR | 10-2009-0033001 | 4/2009 |
| KR | 10-2009-0101043 | 9/2009 |

OTHER PUBLICATIONS

LG Electronics, "Consideration on common search space configuration for rel-11 UEs," 3GPP TSG RAN WG1 Meeting #66b, R1-113196, Oct. 2011, 4 pages.

(Continued)

*Primary Examiner* — Robert M Morlan
*Assistant Examiner* — Nourali Mansoury
(74) *Attorney, Agent, or Firm* — Lee Hong Degerman Kang & Waimey

(57) ABSTRACT

The present invention relates to a method and an apparatus for transceiving downlink control information (DCI) in a wireless access system. More particularly, the method comprises: a step of mapping a physical downlink control channel (PDCCH) to a common search space (CSS) defined within a physical downlink shared channel (PDSCH) region in a frequency first mapping manner; and a step of transmitting DCI to a terminal through the mapped PDCCH.

16 Claims, 20 Drawing Sheets

(52) U.S. Cl.
CPC ............ *H04L 5/005* (2013.01); *H04L 5/0023* (2013.01); *H04W 48/02* (2013.01)

(56) References Cited

U.S. PATENT DOCUMENTS

| | | | |
|---|---|---|---|
| 2011/0038275 A1* | 2/2011 | Kim ..................... | H04W 48/16 370/252 |
| 2011/0069637 A1* | 3/2011 | Liu ....................... | H04L 5/0007 370/254 |
| 2011/0100198 A1* | 5/2011 | Gatzsche ............. | G10H 1/0008 84/615 |
| 2011/0110315 A1 | 5/2011 | Chen et al. | |
| 2011/0149886 A1* | 6/2011 | Xu ....................... | H04B 7/0628 370/329 |
| 2011/0211595 A1* | 9/2011 | Geirhofer ............ | H04B 7/2606 370/478 |
| 2011/0223926 A1* | 9/2011 | Nakao .................. | H04L 5/0053 455/450 |
| 2013/0044664 A1* | 2/2013 | Nory ..................... | H04L 1/0045 370/311 |
| 2013/0064099 A1* | 3/2013 | Kim ..................... | H04L 5/0053 370/241 |
| 2013/0083751 A1* | 4/2013 | Papasakellariou .... | H04L 1/1854 370/329 |
| 2013/0250906 A1* | 9/2013 | Golitschek Edler von Elbwart ............ | H04W 72/0453 370/330 |

OTHER PUBLICATIONS

Nokia Siemens Networks, et al., "On DL Backhaul Control Channel Design Aspects," 3GPP TSG-RAN WG1 Meeting #60bis, R1-102520, Apr. 2010, 6 pages.

PCT International Application No. PCT/KR2012/008597, Written Opinion of the International Searching Authority dated Feb. 25, 2013, 15 pages.

* cited by examiner

METHOD AND APPARATUS FOR TRANSCEIVING DOWNLINK CONTROL INFORMATION IN A WIRELESS ACCESS SYSTEM

CROSS-REFERENCE TO RELATED APPLICATIONS

This application is the National Stage filing under 35 U.S.C. 371 of International Application No. PCT/KR2012/008597, filed on Oct. 19, 2012, which claims the benefit of U.S. Provisional Application Ser. No. 61/548,733, filed on Oct. 19, 2011, the contents of which are all hereby incorporated by reference herein in their entirety.

FIELD OF THE INVENTION

The present invention relates to a wireless access system and, more particularly, to a method for transceiving downlink control information in a wireless access system supporting MTC (Machine-Type Communication) and an apparatus for supporting the same.

BACKGROUND ART

In cellular communication, when a user equipment (or terminal) exists within a cell, in order to perform communication, the user equipment accesses a base station, receives control information for transmitting and receiving data from the base station and, then, transceives (transmits and receives) data to and from the base station. More specifically, since the user equipment transceives data through the base station, in order to transmit data to other cellular user equipments (or terminals), the user equipment transmits its own data to the base station, and, then, after receiving the transmitted data, the base station transmits the received data back to other user equipments. As described above, since a user equipment can transmit data to other user equipments only through the base station, the base station performs scheduling respective to channels and resources for data transception and transmit the channel and resource scheduling information to each user equipment.

Recently, discussions are being made on MTC (Machine-Type Communication) for machine-type devices other than devices that are carried by a person, such as conventional cell phones. The essential element of an MTC device corresponds to having high performance as well as minimizing the fabrication cost of the device. Currently, as one of the most frequently discussed solutions for reducing the cost of the MTC device, a maximum bandwidth of the MTC terminal (or user equipment) is reduced as compared to the maximum bandwidth that is used in the conventional wireless access system. However, in this case, problems may occur in the reception of diverse signals based upon the conventional wireless access system.

DETAILED DESCRIPTION OF THE INVENTION

Technical Objects

An object of the present invention is to propose a method and apparatus for easily transceiving control information between a user equipment and a base station in a wireless access system and, preferably, in a wireless access system supporting machine-type communication (MTC).

Additionally, another object of the present invention is to propose a method and apparatus for minimizing power consumption and simplifying hardware (H/W) of a user equipment.

The technical objects of the present invention will not be limited only to the objects described above. Accordingly, technical objects that have not been mentioned above or additional technical objects of the present application may become apparent to those having ordinary skill in the art from the description presented below.

Technical Solutions

In an aspect of the present invention, as a method for transmitting DCI (Downlink Control Information) in a wireless access system, the method for transmitting downlink control information includes the steps of mapping a PDCCH (Physical Downlink Control Channel) to a CSS (Common Search Space) by using a frequency first mapping method, wherein the CSS is defined in a PDSCH (Physical Downlink Shared Channel) region, and transmitting the DCI to a user equipment through the mapped PDCCH.

In another aspect of the present invention, as a base station configured to transmit DCI (Downlink Control Information) in a wireless access system, the base station includes an RF (Radio Frequency) unit configured to transceiver radio signals, and a processor configured to map a PDCCH (Physical Downlink Control Channel) to a CSS (Common Search Space) by using a frequency first mapping method, wherein the CSS is defined in a PDSCH (Physical Downlink Shared Channel) region, and to transmit the DCI to a user equipment through the mapped PDCCH.

Preferably, the CSS is defined in a first slot within the PDSCH region of each subframe.

Preferably, the CSS is defined in last 4 symbols of the first slot or in a symbol located after a legacy PDCCH (legacy Physical Downlink Control Channel) region up to the last symbol of the first slot.

Preferably, the DCI is transmitted based upon a CRS (Common Reference Signal) or a DMRS (Demodulation Reference Signal).

Preferably, the PDCCH is mapped in CCE (Control Channel Element) units or RB (Resource Blocl) units.

Preferably, the DCI includes information on uplink data transmission duration.

Preferably, the DCI simultaneously designates multiple PDSCH resources or multiple PUSCH (Physical Uplink Shared Channel) resources.

Preferably, the DCI is CRC (Cyclic Redundancy Check) masked by using a group identifier, wherein the group identifier is allocated to a user equipment group including multiple groups.

In yet another aspect of the present invention, as a method for receiving DCI (Downlink Control Information) in a wireless access system, the method for receiving downlink control information includes the step of receiving the DCI through a PDCCH (Physical Downlink Control Channel), wherein the PDCCH is mapped to a CSS (Common Search Space) by using a frequency first mapping method, wherein the CSS is defined in a PDSCH (Physical Downlink Shared Channel) region.

In yet another aspect of the present invention, as a user equipment configured to receive DCI (Downlink Control Information) in a wireless access system, the user equipment includes an RF (Radio Frequency) unit configured to transceiver radio signals, and a processor configured to receive the DCI through a PDCCH (Physical Downlink Control Channel), wherein the PDCCH is mapped to a CSS (Common Search Space) by using a frequency first mapping method, wherein the CSS is defined in a PDSCH (Physical Downlink Shared Channel) region.

Preferably, the CSS is defined in a first slot within the PDSCH region of each subframe.

Preferably, the CSS is defined in last 4 symbols of the first slot or in a symbol located after a legacy PDCCH region up to the last symbol of the first slot.

Preferably, the DCI is transmitted based upon a CRS or a DMRS.

Preferably, the PDCCH is mapped in CCE units or RB units.

Preferably, the DCI includes information on uplink data transmission duration.

Preferably, the DCI simultaneously designates multiple PDSCH resources or multiple PUSCH resources.

Preferably, the DCI is CRC masked by using a group identifier, wherein the group identifier is allocated to a user equipment group including multiple groups.

Advantageous Effects

According to an exemplary embodiment of the present invention, control information may be easily transceived between a user equipment and a base station in a wireless access system and, preferably, in a wireless access system supporting machine-type communication (MTC).

Additionally, according to an exemplary embodiment of the present invention, signal processing and signal detection procedures for signals being transceived between the user equipment and the base station may be simplified, so that power consumption of the user equipment can be minimized, and so that hardware of the user equipment can be simplified.

The effects of the present invention will not be limited only to the effects described above. Accordingly, effects that have not been mentioned above or additional effects of the present application may become apparent to those having ordinary skill in the art from the description presented below.

BRIEF DESCRIPTION OF THE DRAWINGS

The accompanying drawings, which are included as a part of the detailed description in order to provide a further understanding of the present invention, provide exemplary embodiments of the present invention and describes the technical aspects of the present invention along with the detailed description.

BEST MODE FOR CARRYING OUT THE PRESENT INVENTION

Figure 1:
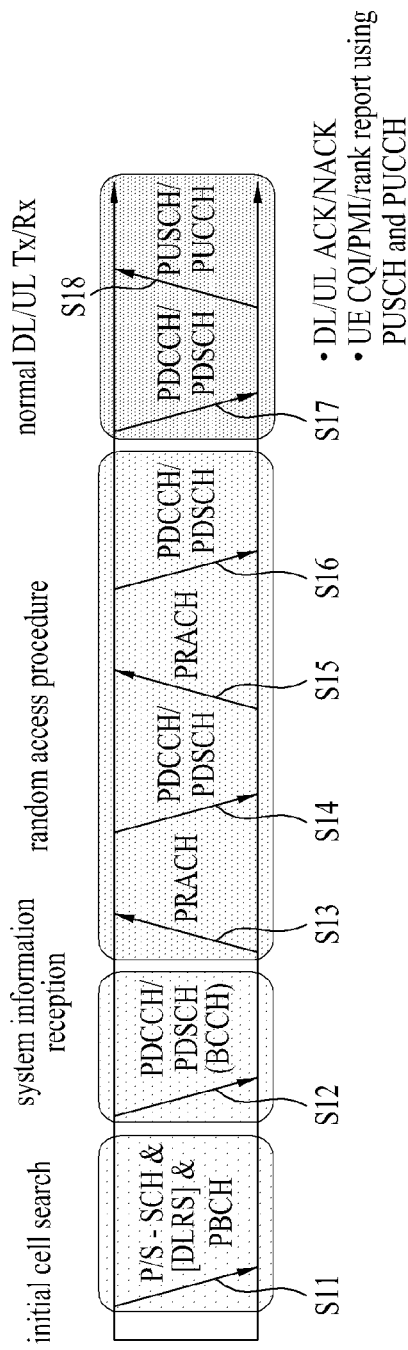
FIG. 1 illustrates physical channels that are used in a 3GPP LTE system and a general signal transmitting method using the same.

Hereinafter, the preferred embodiments of the present invention will now be described in detail with reference to the accompanying drawings. The detailed description of the present invention that is to be disclosed along with the appended drawings is merely given to provide to describe the exemplary embodiment of the present invention. In other words, the embodiments presented in this specification do not correspond to the only embodiments that can be realized according to the present invention. In the following description of the present invention, the description of detailed features of the present invention will be given in order to provide full and complete understanding of the present invention. However, it will be apparent to those skilled in the art that the present invention can be realized even without the detailed features described herein.

In some cases, in order to avoid any ambiguity in the concept (or idea) of the present invention, some of the structures and devices disclosed (or mentioned) in the present invention may be omitted from the accompanying drawings of the present invention, or the present invention may be illustrated in the form of a block view focusing only on the essential features or functions of each structure and device.

In the description of the present invention, the embodiments of the present invention will be described by mainly focusing on the data transmission and reception relation between the base station and the terminal (or user equipment). Herein, the base station may refer to a terminal node of the network that performs direct communication with the terminal. Occasionally, in the description of the present invention, particular operations of the present invention that are described as being performed by the base station may also be performed by an upper node of the base station. More specifically, in a network consisting of multiple network nodes including the base station, it is apparent that diverse operations that are performed in order to communicate with the terminal may be performed by the base station or b network nodes other than the base station. The term 'Base Station (BS)' may be replaced by other terms, such as fixed station, Node B, eNode B (eNB), Access Point (AP), and so on. The term 'relay' may be replaced by terms including Relay Node (RN), Relay Station (RS), and so on. Additionally, the term 'Terminal' may be replaced by terms including UE (User Equipment), MS (Mobile Station), MSS (Mobile Subscriber Station), SS (Subscriber Station), AMS (Advanced Mobile Station), WT (Wireless terminal), MTC (Machine-Type Communication) device, M2M (Machine-to-Machine) device, D2D device (Device-to-Device) device, and so on.

The specific terms used in the following description of the present invention are provided to facilitate the understanding of the present invention. And, therefore, without deviating from the technical scope and spirit of the present invention, such specific terms may also be varied and/or replaced by other terms.

Herein, the embodiments of the present invention may be supported by at least one the disclosed standard documents for wireless access systems including the IEEE 802 system, the 3GPP LTE system, the LTE-A (LTE-Advanced) system, and the 3GPP2 system. More specifically, among the embodiments of the present invention, partial operation steps or structures of the present invention, which have been omitted from the description of the present invention in order to specify and clarify the technical scope and spirit of the present invention may also be supported by the above-described standard documents. Furthermore, the terms disclosed in the description of the present invention may be described based upon the above-mentioned standard documents.

The technology described below may be used in a wide range of wireless access systems, such as CDMA (Code Division Multiple Access), FDMA (Frequency Division Multiple Access), TDMA (Time Division Multiple Access), OFDMA (Orthogonal Frequency Division Multiple Access), SC-FDMA (Single Carrier Frequency Division Multiple Access), and so on. Herein, the CDMA may be realized by a radio technology such as UTRA (Universal Terrestrial Radio Access) or CDMA2000. The TDMA may be realized by a radio technology such as GSM (Global System for Mobile communications)/GPRS (General Packet Radio Service)/EDGE (Enhanced Data Rates for GSM Evolution). The OFDMA may be realized by a radio technology such as IEEE 802.11 (Wi-Fi), IEEE 802.16 (WiMAX), IEEE 802-20, E-UTRA (Evolved UTRA), and so on. The UTRA corresponds to a portion of the UMTS (Universal Mobile Telecommunications System). And, as a portion of the E-UMTS (Evolved UMTS) using the E-UTRA, the 3GPP (3rd Generation Partnership Project) LTE (long term evolution) system adopts the OFDMA in a downlink and adopts the SC-FDMA in an uplink. The LTE-A (LTE-Advanced) corresponds to an evolution of the 3GPP LTE system.

For the clarity in the description of the present invention, the present invention will be described based upon the 3GPP LTE/LTE-A systems. Nevertheless, the scope and spirit of the present invention will not be limited only to those of the 3GPP LTE system and the 3GPP LTE-A system.

1. 3GPP LTE/LTE-A System to which the Present Invention can be Applied 1. 1. General System FIG. 1 illustrates physical channels that are used in a 3GPP LTE system and a general signal transmitting method using the same.

When a power of a user equipment is turned off and then turned back on, or when a user equipment newly enters (or accesses) a cell, the user equipment performs an initial cell search process, such as synchronizing itself with the base station in step S101. For this, the user equipment may receive a P-SCH (Primary Synchronization Channel) and an S-SCH (Secondary Synchronization Channel) from the base station so as to be in synchronization with the base station, and the user equipment may also acquire information, such as cell ID.

Thereafter, the user equipment may receive a PBCH (Physical Broadcast Channel) so as to acquire broadcast information within the cell. Meanwhile, the user equipment may receive DL RS (Downlink Reference Signal), in the step of initial cell search, so as to verify the downlink channel status.

The user equipment that has completed the initial cell search may receive a PDCCH (Physical Downlink Control Channel) and a PDSCH (Physical Downlink Shared Channel) based upon the PDCCH (Physical Downlink Control Channel) information, in step S102, so as to acquire more detailed system information.

Thereafter, in order to complete the access to the base station, the user equipment may perform a Random Access Procedure, such as in steps S103 and S106 of a later process, so as to complete the access to the base station. In order to do so, the user equipment transmits a preamble through a PRACH (Physical Random Access Channel) (S103), and then the user equipment may receive a response message respective to the random access through the PDCCH and its respective PDSCH (S104). In case of a contention based random access, the user equipment may perform Contention Resolution Procedures, such as transmitting an additional Physical Random Access Channel (PRACH) signal (S105) and receiving a Physical Downlink Control Channel (PDCCH) signal and a Physical Downlink Shared Channel (PDSCH) signal corresponding to the PDCCH signal (S106).

After performing the above-described procedures, the user equipment may receive a Physical Downlink Control Channel (PDCCH) signal and/or Physical Downlink Shared Channel (PDSCH) signal (S107), as a general uplink/downlink signal transmission procedure, and may then perform PUSCH (Physical Uplink Shared Channel) signal and/or PUCCH (Physical Uplink Control Channel) signal transmission (S108).

The control information being transmitted by the user equipment to the base station is collectively referred to as UCI (Uplink Control Information). The UCI may include HARQ ACK/NACK (Hybrid Automatic Repeat and reQuest Acknowledgement/Negative-ACK), SR (Scheduling Request), CQI (Channel Quality Indicator), PMI (Precoding Matrix Indicator), RI (Rank Indication), and so on.

In the LTE system, the UCI is generally transmitted through the PUCCH. However, when control information and traffic data are to be transmitted at the same time, the UCI may also be transmitted through the PUSCH. Additionally, based upon a network request/indication, the UCI may be aperiodically transmitted through the PUSCH.

Figure 2:
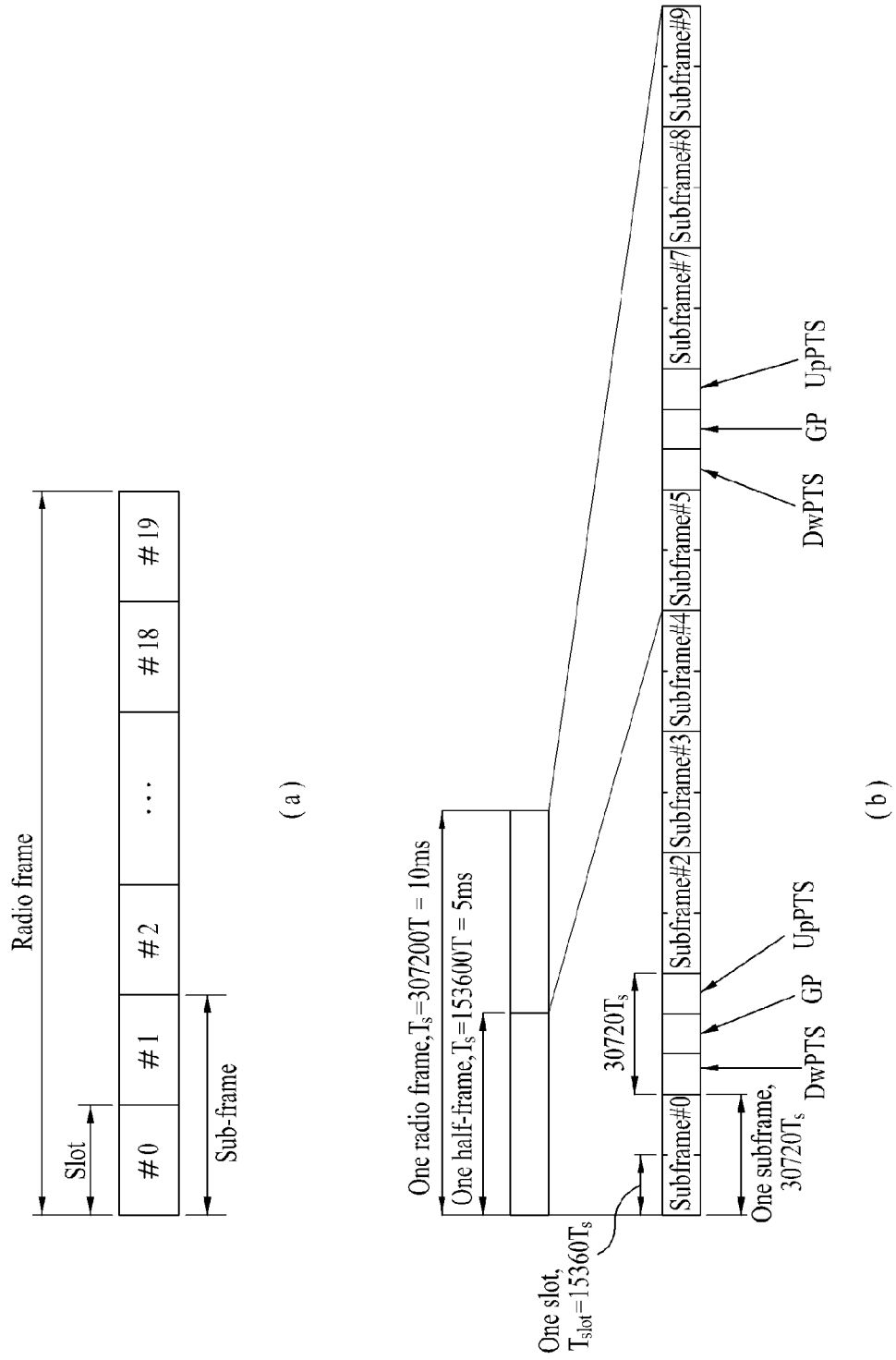
FIG. 2 illustrates a structure of a wireless frame being used in 3GPP LTE.

FIG. 2 illustrates a structure of a wireless frame being used in 3GPP LTE.

In a cellular OFDM radio packet communication system, uplink/downlink data packet transmission is performed in subframe units, and once subframe is defined as a predetermined time period (or time section) including multiple OFDM symbols. The 3GPP LTE standard supports a Type 1 radio frame structure, which is applicable to FDD (Frequency Division Duplex), and a Type 2 radio frame structure, which is applicable to TDD (Time Division Duplex).

FIG. 2(a) illustrates an exemplary structure of a type 1 radio frame. A downlink radio (or wireless) frame is configured of 10 subframes, and one subframe is configured of 2 slots in a time domain. The time consumed (or taken) for one subframe to be transmitted is referred to as a TTI (transmission time interval). For example, the length of one subframe may be equal to 1 ms, and the length of one slot may be equal to 0.5 ms. One slot includes a plurality of OFDM (orthogonal frequency division multiplexing) symbols in the time domain and includes a plurality of Resource Blocks (RBs) in the frequency domain. Since the 3GPP LTE uses the OFDMA in a downlink, an OFDM symbol is used to indicate one symbol section. The OFDM symbol may also be referred to as an SC-FDMA symbol or a symbol section. As a resource allocation unit, a Resource Block (RB) may include a plurality of consecutive subcarriers in one slot.

The number of OFDM symbols included in one slot may vary depending upon the configuration of a CP (Cyclic Prefix). The CP may be divided into an extended CP and a normal CP. For example, in case the OFDM symbol is configured of a normal CP, the number of OFDM symbols included in one slot may be equal to 7. And, in case the OFDM symbol is configured of an extended CP, since the length of an OFDM symbol is increased, the number of OFDM symbols included in one slot becomes smaller than when the OFDM symbol is configured of a normal CP. In case of the extended CP, for example, the number of OFDM symbols included in one slot may be equal to 6. In case the user equipment is moving at high speed, or in case the channel status is unstable, the extended CP may be used in order to further reduce the interference between the symbols.

In case of using the normal CP, since one slot includes 7 OFDM symbols, one subframe includes 14 OFDM symbols. At this point, the first maximum of 3 OFDM symbols of each subframe are allocated to a PDCCH (physical downlink control channel), and the remaining OFDM symbols may be allocated to a PDSCH (physical downlink shared channel).

(b) of FIG. 2 illustrates an exemplary structure of a type 2 radio frame. The type 2 radio frame consists of 2 half frames, each half frame is configured of 5 general subframes, and each subframe is configured of 2 slots. Most particularly, among the 5 subframes, a special subframe consists of a DwPTS (Downlink Pilot Time Slot), a Guard Period (GP), and a UpPTS (Uplink Pilot Time Slot). The DwPTS is used for performing initial cell search, synchronization or channel estimation in the user equipment. And, the UpPTS is used for matching a channel estimation performed in the based station with an uplink transmission synchronization performed in the user equipment. The guard period refers to a period for eliminating (or removing) interference that occurs in an uplink, due to a multiple path delay of a downlink signal between an uplink and a downlink.

The above-described structure of the radio frame is merely exemplary. And, therefore, the number of subframes included in the radio frame or the number of slots included in a subframe, and the number of symbols included in one slot may be diversely varied.

Figure 3:
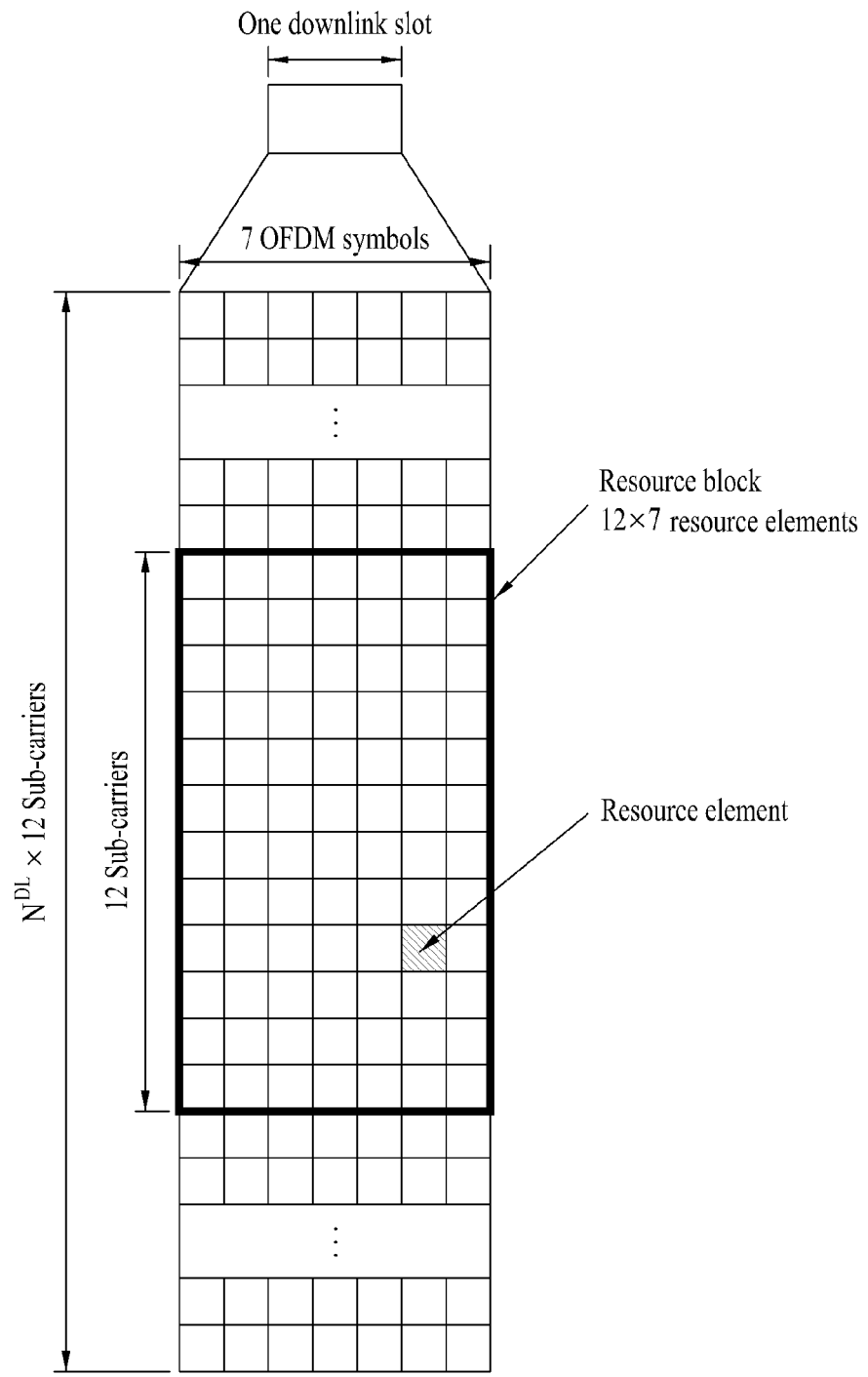
FIG. 3 illustrates an exemplary resource grid of a downlink slot.

FIG. 3 illustrates an exemplary resource grid of a downlink slot.

Referring to FIG. 3, a downlink slot includes multiple OFDM symbols in the time domain. Herein, one downlink slot may include 7 OFDM symbols in a time domain, and a resource block (RB) may include 12 sub-carriers in the frequency domain. Although this may be described as an example, the present invention will not be limited only to this.

Each element within the resource grid is referred to as a Resource Element (RE). One resource block includes 12×7 resource elements. NDL, which corresponds to a number of resource blocks included in a downlink slot, is dependent to a downlink transmission bandwidth. The structure of an uplink slot may be identical to the structure of the downlink slot.

Figure 4:
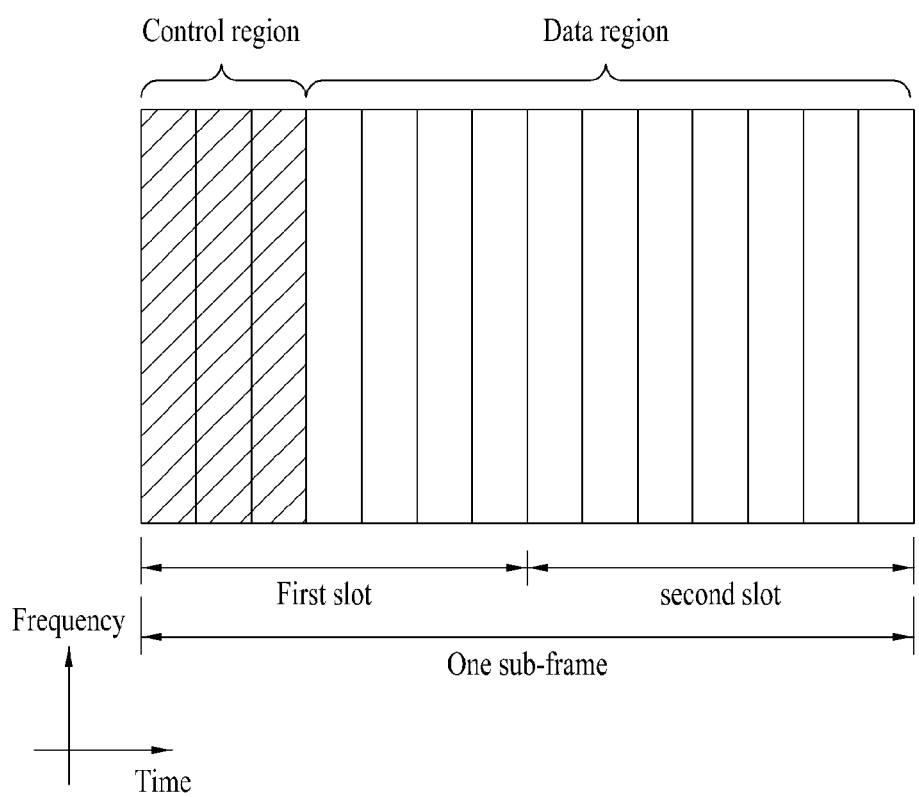
FIG. 4 illustrates a structure of a downlink subframe.

FIG. 4 illustrates a structure of a downlink subframe.

Referring to FIG. 4, a maximum of 3 OFDM symbols located at the front portion (or beginning) of a first slot within one subframe collectively corresponds to a control region, wherein a control channel is allocated (or assigned), and the remaining OFDM symbols collectively correspond to a data region, wherein a Physical Downlink Shared Channel (PDSCH) is assigned. Examples of the downlink control channels that are being used in the LTE system may include a Physical Control Format Indicator Channel (PCFICH), a PDCCH, a Physical Hybrid automatic repeat request Indicator Channel (PHICH), and so on.

The PCFICH is transmitted from a first OFDM symbol of the subframe, and the PCFICH carries information on the number of OFDM symbols (i.e., size of the control region), which are being used for the transmission of control channels within the subframe. The PHICH corresponds to a response channel respective to the uplink, and the PHICH may carry an ACK (Acknowledgment)/NACK (Not-Acknowledgment) signal respective to an HARQ (Hybrid Automatic Repeat Request). The control information being transmitted through the PDCCH may be referred to as DCI (Downlink Control Information). Herein, the DCI may include uplink resource allocation information, downlink resource allocation information, or an uplink transmission (Tx) power control command respective to an arbitrary user equipment group.

Figure 5:
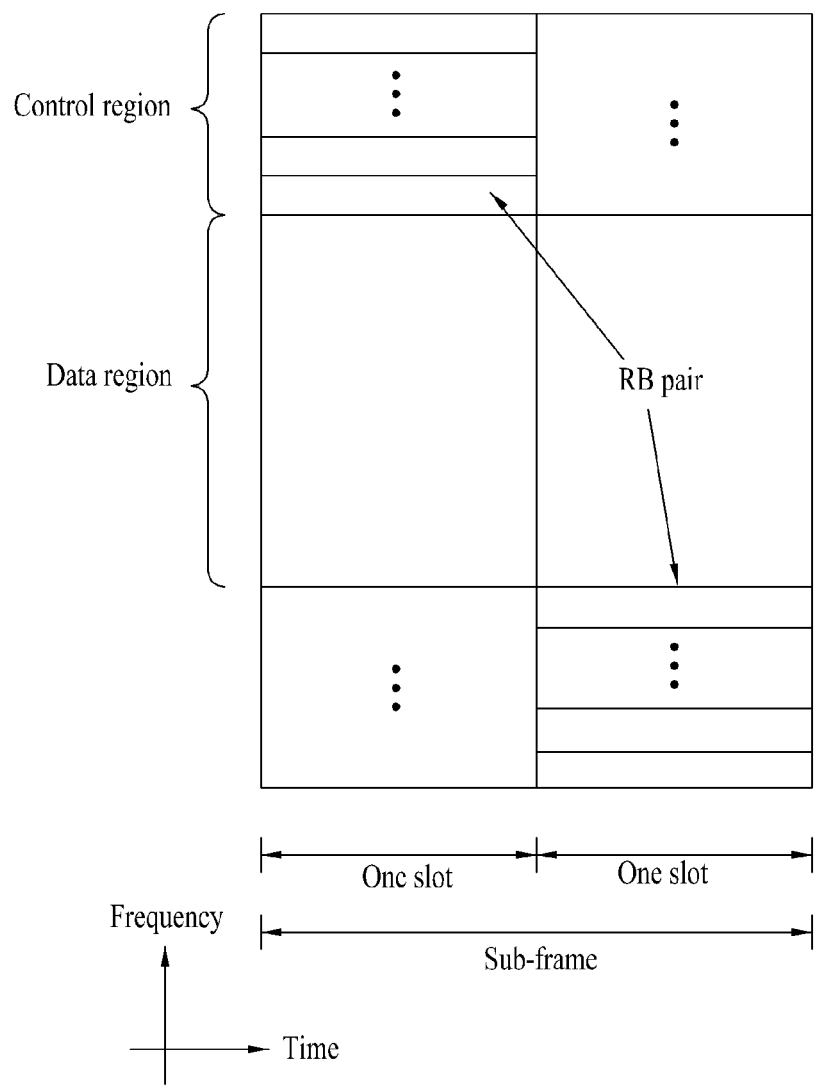
FIG. 5 illustrates a structure of an uplink subframe.

FIG. 5 illustrates a structure of an uplink subframe.

Referring to FIG. 5, a UL subframe may be divided into a data region and a control region in the frequency domain. A PUCCH (Physical Uplink Control Channel), which carries uplink control information, is allocated to the control region. And, a PUSCH (Physical Uplink Shared Channel), which carries user data, is allocated to the data region. In order to maintain the characteristics of a single carrier, one user equipment does not transmit a PUCCH and a PUSCH at the same time. A PUCCH respective to a user equipment is allocated with an RB pair in a subframe. And, the RBs belonging to the RB pair occupy different subcarriers in two slots. This may also be described (or expressed) as the RB pair, which is allocated to the PUCCH, being frequency-hopped at a slot boundary.

Figure 6:
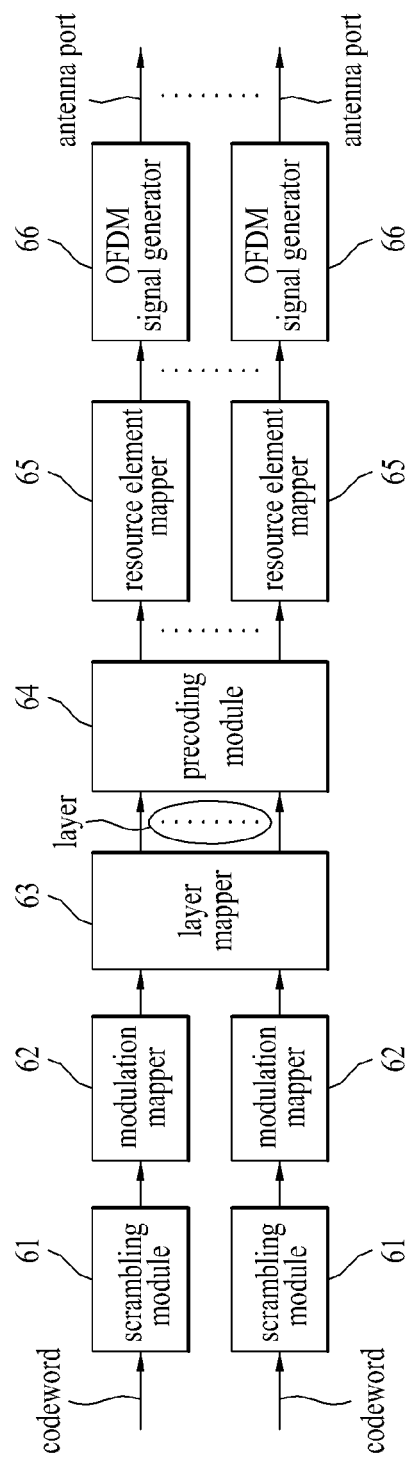
FIG. 6 illustrates a signal processing procedure of a base station for transmitting a downlink signal.

FIG. 6 illustrates a signal processing procedure of a base station for transmitting a downlink signal.

In a 3GPP LTE system, a base station may transmit one or more CWs (codewords). Accordingly, each of the codewords may be processed as a complex symbol by a scrambling module (61) and a modulation mapper (62). Subsequently, each of the complex symbols may be mapped to a plurality of layers by a layer mapper (63), and each layer may be multiplied by a predetermined precoding matrix by a precoding module (64), thereby being allocated to each transmitting antenna. Each of the processed transmission signals respective to an antenna is mapped to a time-frequency resource element by a respective resource element mapper (65). Thereafter, each of the transmission processed signals passes through an OFDM (Orthogonal Frequency Division Multiple Access) signal generator (66) so as to be transmitted through each antenna.

Figure 7:
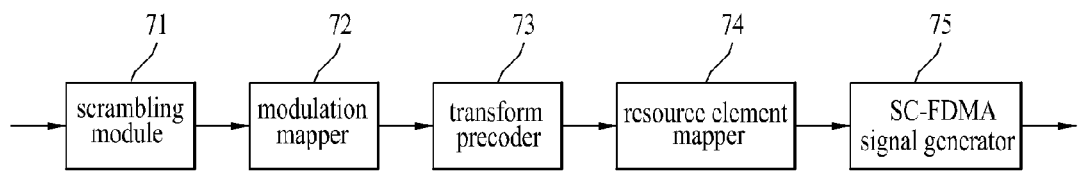
FIG. 7 illustrates a signal processing procedure of a user equipment for transmitting an uplink signal.

FIG. 7 illustrates a signal processing procedure of a user equipment for transmitting an uplink signal.

In order to transmit an uplink signal, a scrambling module (71) of the user equipment may scramble a transmission signal by using a user equipment specific scrambling signal. Then, the scrambled signal is inputted to a modulation mapper (72) so as to be modulated to a complex symbol by using a BPSK (Binary Phase Shift Keying) scheme, a QPSK (Quadrature Phase Shift Keying) scheme, or a 16QAM/64QAM (Quadrature Amplitude Modulation) scheme, based upon a type of the transmission signal and/or a channel status. The modulated complex symbol is processed by a conversion precoder (73) and then inputted to a resource element mapper (74). Herein, the resource element mapper (74) may map the complex symbol to a time-frequency resource element. The processed signal may then pass through an SC-FDMA signal generator (75) so as to be transmitted to the base station through an antenna.

Since the OFDMA scheme uses multiple subcarriers, the OFDMA scheme may be disadvantageous in that a PAPR (Peak-to-Average Ratio) may be relatively greater due to the overlapping of the subcarriers. Therefore, as described above in association to FIG. 6 and FIG. 7, in order to compensate for the disadvantage of high PAPR in a user equipment, which is valued for its energy efficiency, in the 3GPP system (e.g., LTE system), the OFDMA scheme is used for downlink signal transmission, and the SC-FDMA (Single Carrier-Frequency Division Multiple Access) scheme is used for uplink signal transmission. The SC-FDMA scheme may also be referred to as a DFTs OFDM (Discrete Fourier Transform-spread OFDM).

1. 2. Control Channel of a Downlink System

In a wireless communication system, since data/signals are being transmitted through a wireless channel, the data/signals may be distorted during the wireless transmission. In order to allow a receiving end to accurately (or correctly) receive the distorted signal(s), it will be preferable to correct the received distorted signal by using channel information. At this point, in order to detect channel information, a receiving end and/or a transmitting end may use a reference signal, which is known to both ends. The reference signal may also be referred to as a pilot signal.

When the transmitting end transceives data by using multiple input/output antennae, in order to allow the receiving end to correctly receive data, it will be preferable to detect channel status between the transmitting antenna and the receiving antenna. At this point, in order to allow the receiving end to detect the channel status, it will be preferable for each transmitting antenna of the transmitting end to have a separate reference signal.

A downlink reference signal may be categorized as a CRS (Common RS), which is shared by all user equipments existing within one cell, and a DRS (Dedicated RS), which is dedicated to one specific user equipment. The transmitting end may provide information for demodulation and channel measurement by using such reference signals (CRS, DRS).

The receiving end (e.g., user equipment) may measure the channel status by using the CRS, and, then, the receiving end may feed-back indicators related to the channel quality, such as CQI (Channel Quality Indicator), PMI (Precoding Matrix Index) and/or RI (Rank Indicator), to the transmitting end (e.g., base station) in accordance with the measured channel status. In the exemplary embodiments of the present invention, the CRS may also be referred to as a cell-specific RS. Conversely, a reference signal related to feedback of the channel status information (CSI) may be referred to as a CSI-RS.

In case data demodulation is required within the PDSCH, the DRS may be transmitted to the user equipments through resource elements. The user equipment may receive information on the existence or absence of a DRS via higher layer signaling. The DRS is valid only when a respective PDSCH signal is mapped to the DRS. In the exemplary embodiments of the present invention, the DRS may also be referred to as a UE-specific RS or a DMRS (Demodulation RS).

Figure 8:
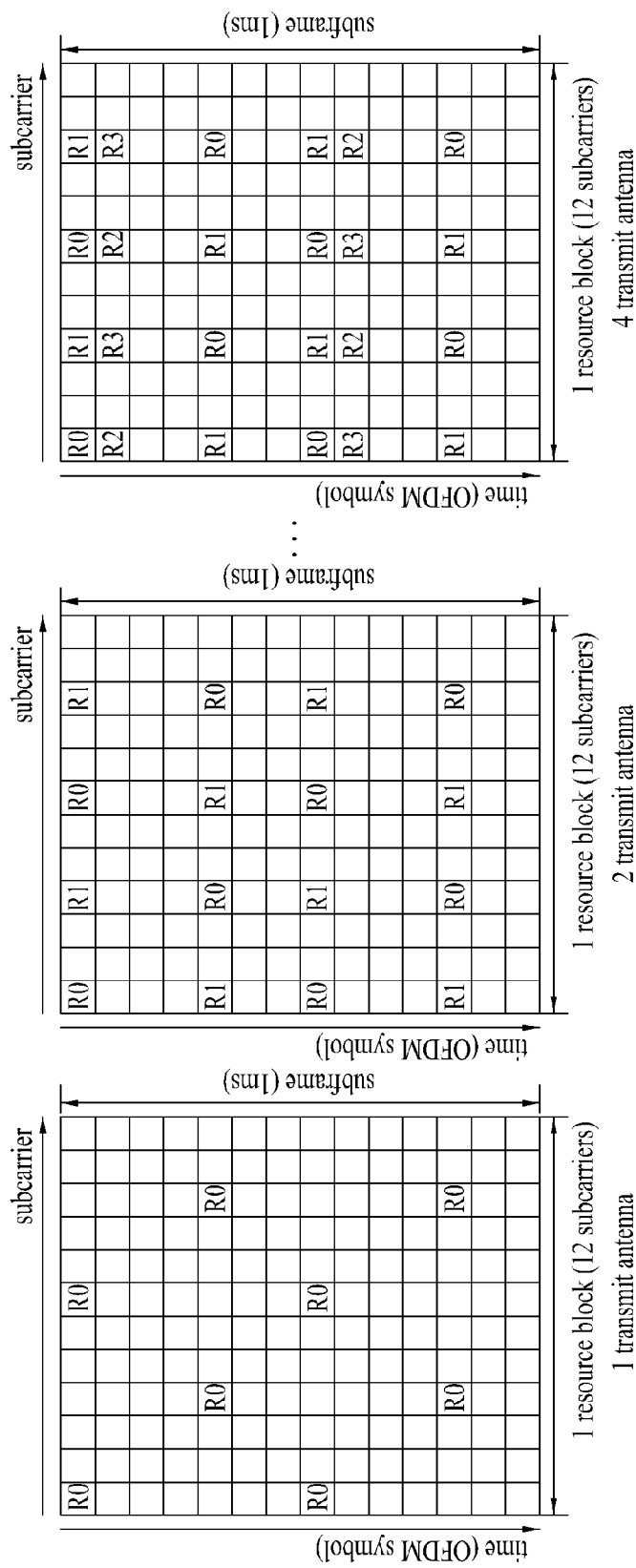
FIG. 8 illustrates an exemplary downlink reference signal structure for a system having 1, 2, 4 transmitting antennae (Tx antennae) in case of a normal cyclic prefix.

FIG. 8 illustrates an exemplary downlink reference signal structure for a system having 1, 2, 4 transmitting antennae (Tx antennae) in case of a normal cyclic prefix.

Referring to FIG. 8, R0 represents a reference signal respective to transmitting antenna 0, R1 represents a reference signal respective to transmitting antenna 1, R2 represents a reference signal respective to transmitting antenna 2, and R3 represents a reference signal respective to transmitting antenna 3. In order to eliminate interference occurring in a subcarrier, in which the reference signals of each transmitting antenna have been used, with the exception for the transmitting antenna transmitting the corresponding reference signal, signals respective to all of the other transmitting antennae are not transmitted.

Figure 9:
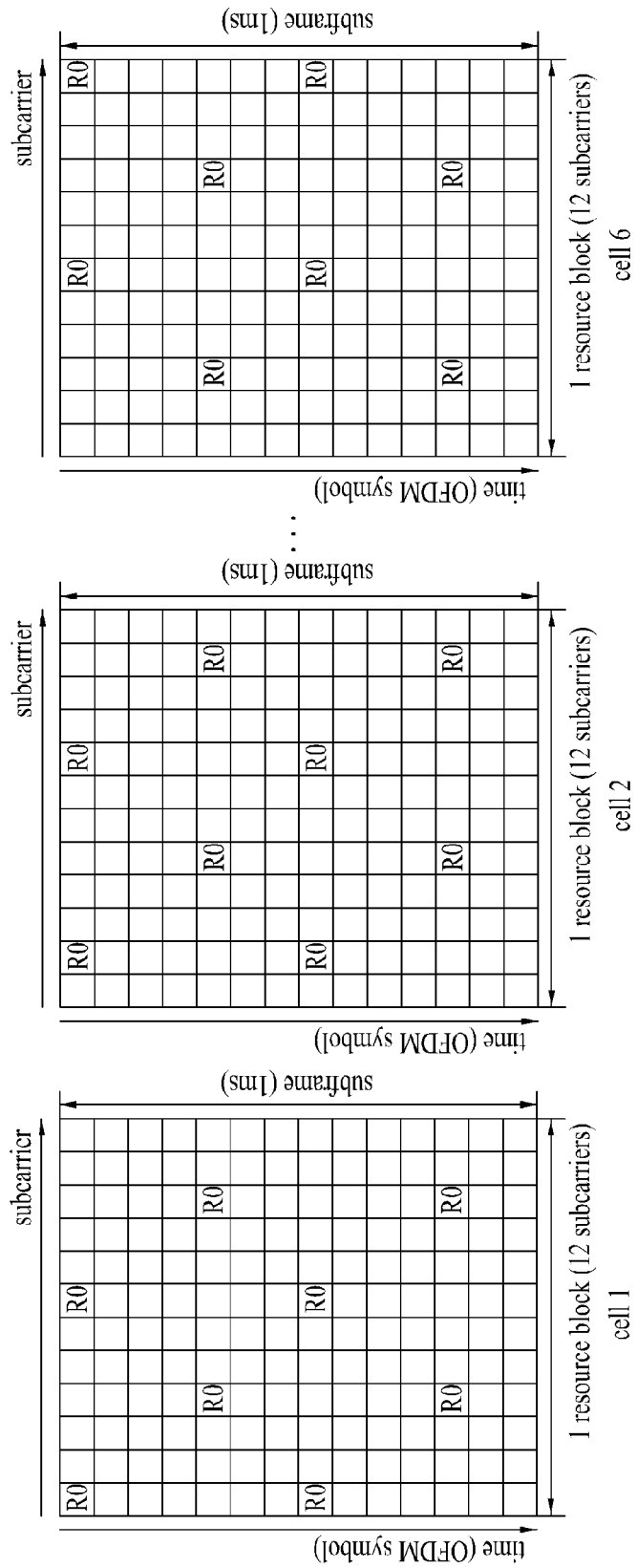
FIG. 9 illustrates an exemplary downlink reference signal structure according to a frequency shift of a reference signal respective to a cell, in case of a normal cyclic prefix.

FIG. 9 illustrates an exemplary downlink reference signal structure according to a frequency shift of a reference signal respective to a cell, in case of a normal cyclic prefix.

Referring to FIG. 9, when it is assumed that a structure of a reference signal (or pilot symbol) for the system having 1 transmitting antenna of FIG. 8 is used for Cell 1 of FIG. 9, in Cell 2 and Cell 3, in order to prevent collision of reference signals from occurring between cells, reference signals may be protected by performing subcarrier unit (or subcarrier wise) or OFDM symbol unit (or OFDM symbol wise) shift in the frequency domain or the time domain. For example, as shown in FIG. 9, in case of a system having one transmitting antenna, each reference signal may be located in the frequency domain at an interval of 6 subcarriers. Accordingly, by performing subcarrier unit shift in the frequency domain, at least 5 neighboring cells may allow the respective reference signals to be located in different positions within the frequency domain.

Additionally, by multiplying a PN (Pseudo-random) sequence to a cell-specific downlink reference signal, and by transmitting the multiplied result, the receiver may reduce interference of the reference signal, which is received from a neighboring cell, thereby being capable of enhancing channel estimation performance. Such PN sequence may be applied in OFDM symbol units within a single subframe, and such PN sequence may be applied to another sequence in accordance with a cell identifier (cell ID), a subframe number (or subframe index), and an OFDM symbol position.

Figure 10:
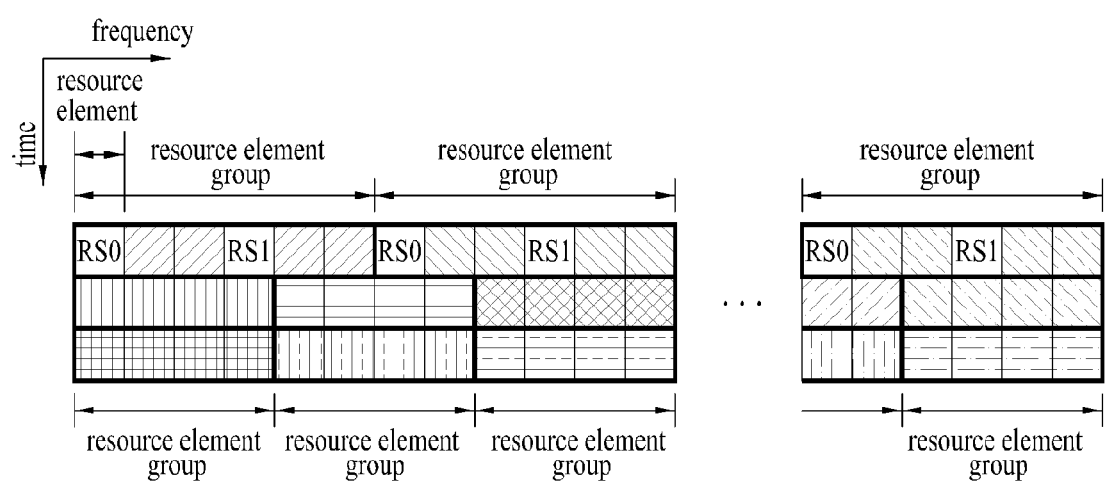
FIG. 10 illustrates a resource configuration of a downlink control channel in a system having 1 transmitting antenna or 2 transmitting antennae.
Figure 11:
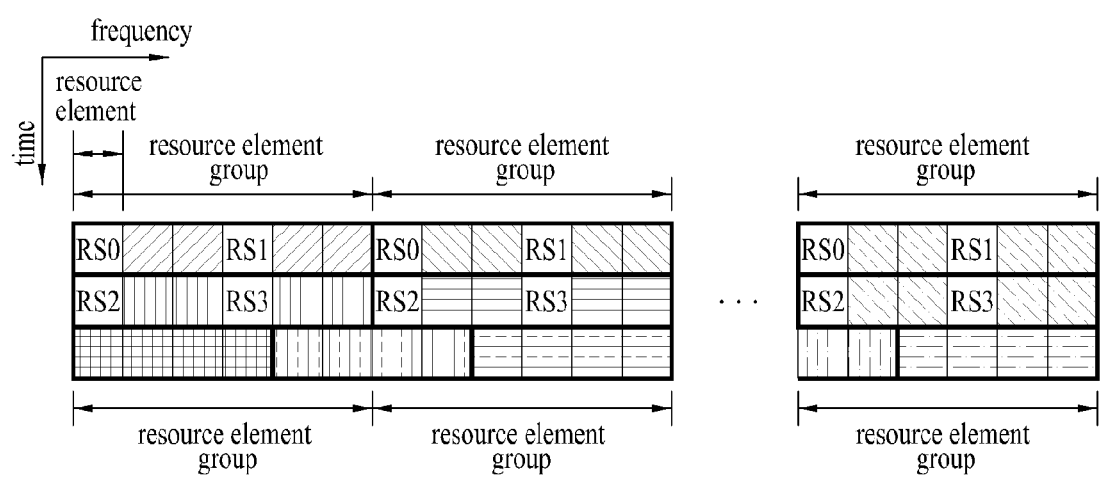
FIG. 11 illustrates a resource configuration of a downlink control channel in a system having 4 transmitting antennae.

In order to allocate the above-described downlink control channel to each subframe, the resource may be configured as shown in FIG. 10 and FIG. 11.

FIG. 10 illustrates a resource configuration of a downlink control channel in a system having 1 transmitting antenna or 2 transmitting antennae, and FIG. 11 illustrates a resource configuration of a downlink control channel in a system having 4 transmitting antennae. In FIG. 10 and FIG. 11, R0 represents a reference signal (or pilot symbol) respective to transmitting antenna 0, R1 represents a reference signal respective to transmitting antenna 1, R2 represents a reference signal respective to transmitting antenna 2, and R3 represents a reference signal respective to transmitting antenna 3.

Referring to FIG. 10 and FIG. 11, the configuration of a basic resource of the downlink control channel consists of an REG (Resource Element Group). The REG is used in order to define mapping of a control channel to a resource element, and, with the exception for the resource element that is used for transmitting the reference signal, the REG may be configured of 4 contiguous resource elements in the frequency domain. Depending upon certain circumstances, a specific number of REGs may be used as the downlink control channel. Herein, the resource element is used as a single subcarrier.

Hereinafter, the PCFICH will be described in detail.

The PCFICH is transmitted through a first OFDM symbol (OFDM symbol number 0) for each subframe. The PCFICH may be transmitted through a single antenna, or the PCFICH may be transmitted by adopting a transmit diversity method. When receiving a subframe, the user equipment first verifies the control information that is being transmitted through the PCFICH, and, then, the user equipment received the control information that is being transmitted through the PDCCH.

The base station transmits a PDCCH for resource allocation information of each subframe between OFDM symbol number 0 to OFDM symbol number 2 of each subframe, and, then, in accordance with the size of the downlink control channel, the base station may transmit downlink control channel information to OFDM symbol number 0, OFDM symbol number 0 and OFDM symbol number 1, and OFDM symbol number 0 to OFDM symbol number 2. As described above, the number of OFDM symbols used by the downlink control channel may be changed for each subframe, and information on the same is notified by the PCFICH. Accordingly, the PCFICH shall be transmitted for each subframe.

The control information that is being transmitted through the PCFICH is also referred to as a CFI (Control Format Indicator). For example, a CFI value may be equal to 1, 2, or 3, and the CFI value may represent a number of OFDM symbols that are used for the PDCCH transmission in the subframe. However, this is merely exemplary, and the information that is indicated by the CFI may be differently defined in accordance with the system bandwidth. For example, in case the bandwidth of the system is smaller than a specific threshold value, the CFI values 1, 2, and 3 may respectively indicate that the number of OFDM symbols being used for the PDCCH transmission in each subframe is equal to 2, 3, and 4.

Table 1 below shows an example of the CFI of a PCFICH and a 32-bit codeword, which is generated by performing channel coding with respect to the CFI.

TABLE 1

| CFI | CFI codeword $< b_0, b_1, \ldots, b_{32} >$ |
|---|---|
| 1 | <0,1,1,0,1,1,0,1,1,0,1,1,0,1,1,0,1,1,0,1,1,0,1,1,0,1,1,0,1,1,0,1> |
| 2 | <1,0,1,1,0,1,1,0,1,1,0,1,1,0,1,1,0,1,1,0,1,1,0,1,1,0,1,1,0,1,1,0> |
| 3 | <1,1,0,1,1,0,1,1,0,1,1,0,1,1,0,1,1,0,1,1,0,1,1,0,1,1,0,1,1,0,1,1> |
| 4 (reserved) | <0,0,0,0,0,0,0,0,0,0,0,0,0,0,0,0,0,0,0,0,0,0,0,0,0,0,0,0,0,0,0,0> |

Referring to Table 1, when CFI=1, this indicates that the PDCCH is being transmitted only from the $0^{th}$ OFDM symbol, and, when CFI=2 and CFI=3, this respectively indicates that the PDCCH is being transmitted from the $0^{th}$ to $1^{st}$ OFDM symbols and that the PDCCH is being transmitted from the $0^{th}$ to $2^{nd}$ OFDM symbols.

The CFI codeword may be modulated by using a QPSK (Quadrature Phase Shift Keying) scheme. In this case, the 32 bit codeword is modulated to 16 symbols. Accordingly, 16 subcarriers are being used for the PCFICH transmission.

Figure 12:
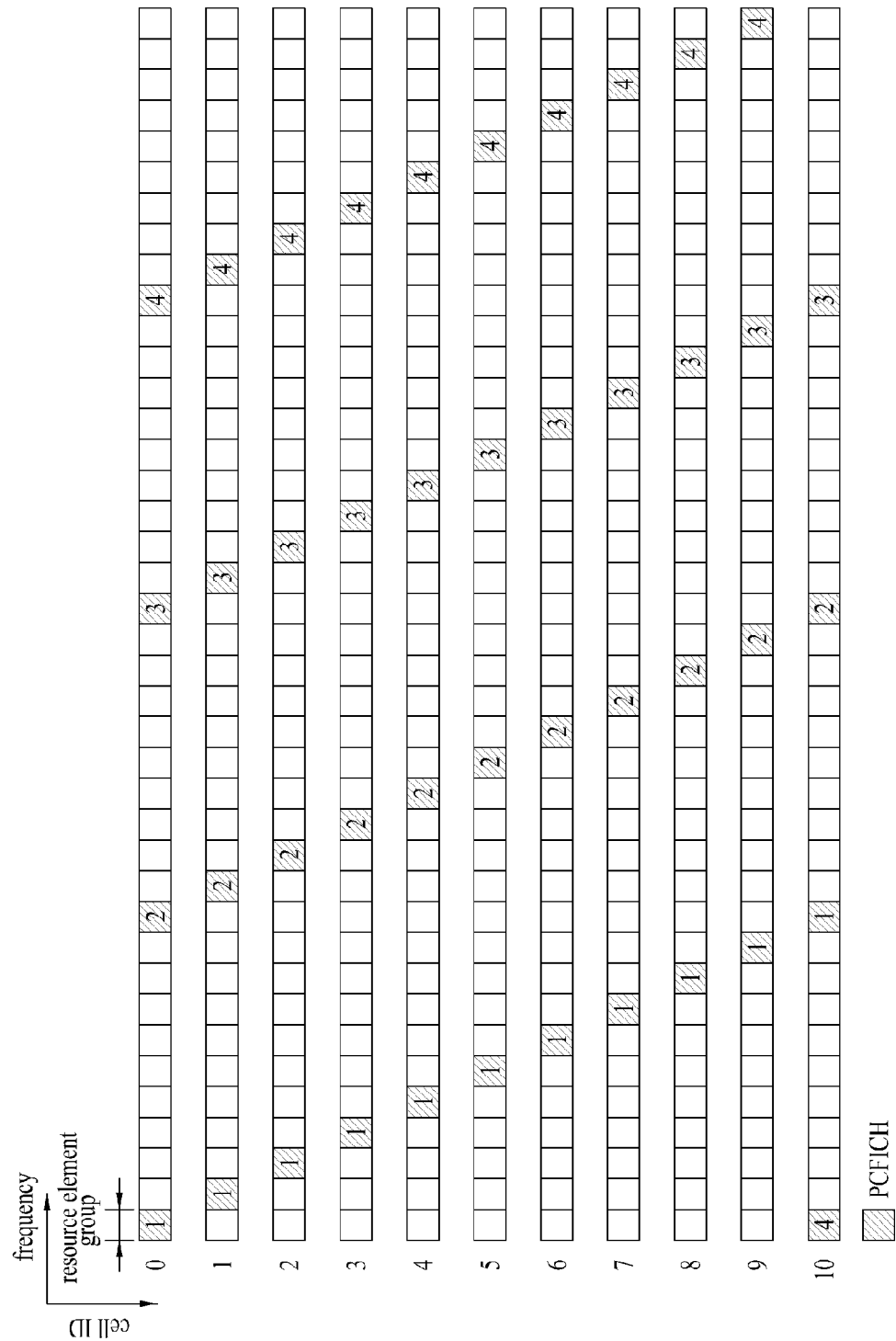
FIG. 12 illustrates an exemplary transmission format of a PCFICH.

FIG. 12 illustrates an exemplary transmission format of a PCFICH.

Referring to FIG. 12, the REG is configured of 4 subcarriers, and, with the exception for the reference signal, the REG is configured only of data subcarriers. As described above, since 16 subcarriers are being used for the PCFICH transmission, 4REGs may be used for the PCFICH transmission. The REG having the PCFICH mapped thereto may vary depending upon the number of resource blocks in the frequency domain in the frequency domain. In order to prevent inter-cell interference of the PCFICH, the REG having the PCFICH mapped thereto may be shifted in the frequency domain in accordance with the cell ID. Since the PCFICH is always transmitted to the first OFDM symbol of the subframe, when receiving the subframe, the receiver verifies the information on the PCFICH firsthand, and, then, the receiver receives the information on the PDCCH.

Hereinafter, the PHICH will be described in detail.

The PHICH corresponds to a channel that transmits ACK/NACK information respective to an uplink data channel, and multiple PHICHs configure a single PHICH group, which is mapped to the same REG. The PHICHs configuring the single PHICH group may each be differentiated from one another by a different sequence. For example, orthogonal sequences may be used. One PHICH group includes PHICH channels respective to multiple user equipments. Multiple PHICH groups may be created within a single subframe. For example, the ACK/NACK information that is being transmitted through the PHICH may be repeated (or iterated) 3 times and may be spread to be multiplied by 4, thereby configuring 12 symbols. In this case, 3 REGs may be used for the PHICH transmission.

Figure 13:
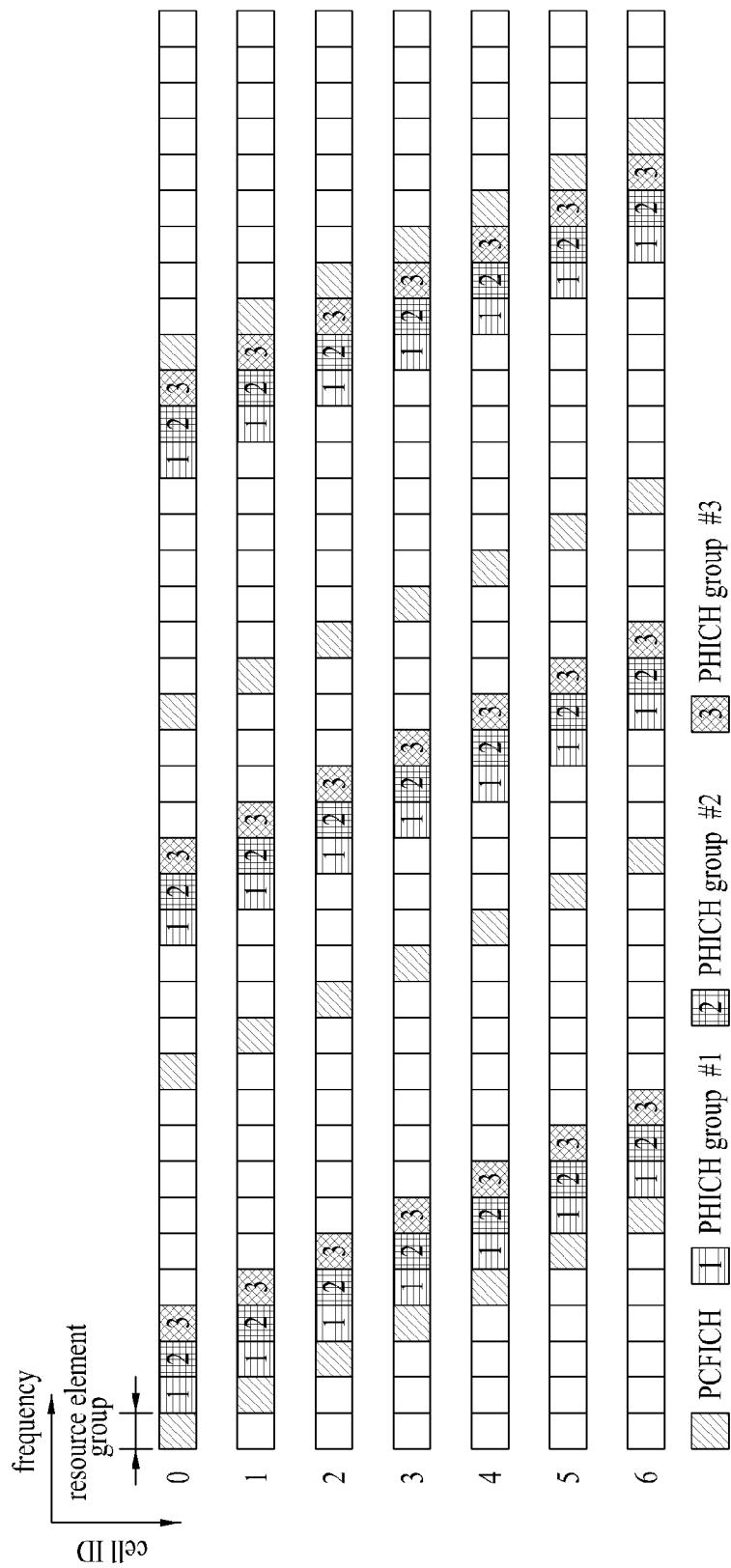
FIG. 13 illustrates an example of a PCFICH and a PHICH being mapped to an REG.

FIG. 13 illustrates an example of a PCFICH and a PHICH being mapped to an REG.

Referring to FIG. 13, an example of 3 PHICH groups is shown. Each PHICH group is mapped to an REG to which the PCFICH is not mapped. Each PHICH group is transmitted through 3 REGs. The REG having each of the PHICH groups mapped thereto may be shifted in the frequency domain in accordance with the cell ID in order to prevent inter-cell interference from occurring.

In multiple PHICH groups, the PHICH allocation respective to each user equipment is performed by using a lowest PRB (Physical Resource Block) index of a PUSCH resource allocation and a cyclic shift of a demodulation reference signal (DMRS) that is being transmitted to an uplink grant. The PHICH resource is known as an index pair, such as $(n_{PHICH}^{group}, n_{PHICH}^{seq})$. Herein, in the index pair $(n_{PHICH}^{group}, n_{PHICH}^{seq})$, $n_{PHICH}^{group}$ indicates a PHICH group number, and $n_{PHICH}^{seq}$ represents an orthogonal sequence index within the corresponding PHICH group.

Table 2 below shows an exemplary orthogonal sequence that is being used in a 3GPP LTE system.

TABLE 2

| Sequence index $n_{PHICH}^{seq}$ | Orthogonal sequence | |
|---|---|---|
| | Normal cyclic prefix $N_{SF}^{PHICH} = 4$ | Extended cyclic prefix $N_{SF}^{PHICH} = 2$ |
| 0 | [+1 +1 +1 +1] | [+1 +1] |
| 1 | [+1 −1 +1 −1] | [+1 −1] |
| 2 | [+1 +1 −1 −1] | [+j +j] |
| 3 | [+1 −1 −1 +1] | [+j −j] |
| 4 | [+j +j +j +j] | — |
| 5 | [+j −j +j −j] | — |
| 6 | [+j +j −j −j] | — |
| 7 | [+j −j −j +j] | — |

The above-described $n_{PHICH}^{group}$ and $n_{PHICH}^{seq}$ may be calculated by using Equation 1 shown below.

$$n_{PHICH}^{group} = (I_{PRB\_RA}^{lowest\_index} + n_{DMRS}) \bmod N_{PHICH}^{group}$$

$$n_{PHICH}^{seq} = (\lfloor I_{PRB\_RA}^{lowest\_index}/N_{PHICH}^{group} \rfloor + n_{DMRS}) \bmod 2N_{SF}^{PHICH}$$

[Equation 1]

In Equation 1, $n_{DMRS}$ indicates a cyclic shift of a DMRS that is being used in an uplink transmission associated with the PHICH, $N_{SF}^{PHICH}$ represents the size of a spreading factor that is being used in the PHICH, $I_{PRB\_RA}^{lowest\_index}$ indicates a lowest PRB index of an uplink resource allocation, and $N_{PHICH}^{group}$ represents a number of PHICH groups.

$N_{PHICH}^{group}$ may be calculated by using Equation 2 shown below.

$$N_{PHICH}^{group} = \begin{cases} \lceil N_g(N_{RB}^{DL}/8) \rceil & \text{for normal cyclic prefix} \\ 2 \cdot \lceil N_g(N_{RB}^{DL}/8) \rceil & \text{for extended cyclic prefix} \end{cases}$$

[Equation 2]

In Equation 2, $N_g$ indicates information related to a PHICH resource size, which is being transmitted to a PBCH (Physical Broadcast Channel), and which is being expressed as 2 bits ($N_g \in \{1/6, 1/2, 1, 2\}$), and $N_{RB}^{DL}$ represents a number of resource blocks (RBs) in a downlink.

Figure 14:
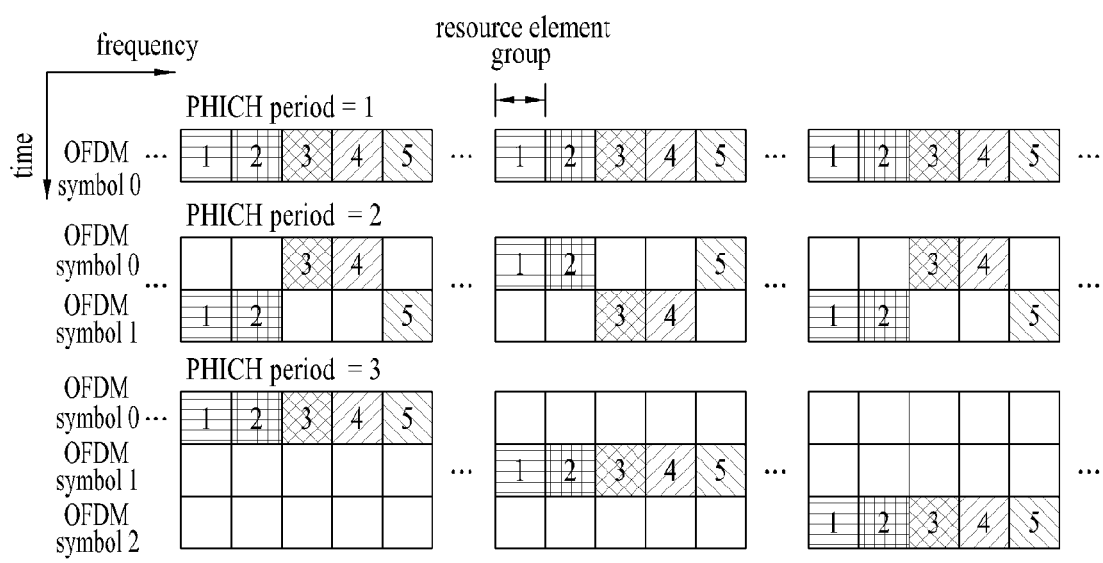
FIG. 14 illustrates an exemplary configuration of a PHICH group within a subframe respective to a PHICH duration.

FIG. 14 illustrates an exemplary configuration of a PHICH group within a subframe respective to a PHICH duration.

As shown in FIG. 14, the PHICH group may be configured of different time domains within a single subframe depending upon the PHICH duration ({1, 2, 3}).

Hereinafter, the PDCCH will be described in detail.

Control information being transmitted through the PDCCH is referred to as DCI (Downlink Control Indicator). The PDCCH may have different size and purpose of the control information in accordance with the DCI format and may also vary in size depending upon the coding rate.

Table 3 below shows DCI respective to the DCI format.

TABLE 3

| DCI format | Objectives |
|---|---|
| 0 | Scheduling of PUSCH |
| 1 | Scheduling of one PDSCH codeword |
| 1A | Compact scheduling of one PDSCH codeword |
| 1B | Closed-loop single-rank transmission |
| 1C | Paging, RACH response and dynamic BCCH |
| 1D | MU-MIMO |
| 2 | Scheduling of rank-adapted closed-loop spatial multiplexing mode |

TABLE 3-continued

| DCI format | Objectives |
|---|---|
| 2A | Scheduling of rank-adapted open-loop spatial multiplexing mode |
| 3 | TPC commands for PUCCH and PUSCH with 2 bit power adjustments |
| 3A | TPC commands for PUCCH and PUSCH with single bit power adjustments |

Referring to Table 3, examples of the DCI format includes Format 0 for PUSCH scheduling, Format 1 for scheduling a PDSCH codeword, Format 1A for performing a compact scheduling of a PDSCH codeword, Format 1C for performing a very compact scheduling of a DL-SCH, Format 2 for performing PDSCH scheduling in a Closed-loop spatial multiplexing mode, Format 2A for performing PDSCH scheduling in an Open-loop spatial multiplexing mode, and Formats 3 and 3A for transmitting a TPC (Transmission Power Control) command for an uplink channel. DCI Format 1A may be used for PDCH scheduling regardless of the transmission mode that is being set up.

Such DCI formats may be independently applied for each user equipment, and the PDCCH of multiple user equipments may be multiplexed in a single subframe. The PDCCH is configured of an aggregation of one CCE (control channel element) or several consecutive CCEs (control channel elements). The CCE corresponds to a logical allocation unit that is used for providing the PDCCH with a coding rate respective to the status of a wireless (or radio) channel. The CCE refers to a unit corresponding to 9 sets of REGs, each being configured of 4 resource elements. In order to configure a single PDCCH signal, the base station may use {1, 2, 4, 8} number of CCEs, and, at this point, {1, 2, 4, 8} may be referred to as a CCE aggregation level. The number of CCEs being used for the transmission of a specific PDCCH is decided by the base station in accordance with the channel status. The PDCCH that is configured in each user equipment is interleaved and mapped to the control channel region of each subframe in accordance with a CCE-to-RE mapping rule. The position of the PDCCH may vary depending upon the number of OFDM symbols for the control channel of each subframe, the number of PHICH groups, the transmitting antenna, the cyclic shift, and so on.

As described above, channel coding is independently performed on the PDCCH of each multiplexed user equipment and CRC (Cyclic Redundancy Check) is applied to the processed PDCCH. A unique identifier of each user equipment (UE ID) is masked, so that the user equipment can receive its own PDCCH. However, in the control region, which is allocated within the subframe, the base station does not provide the user equipment with any information on where the corresponding PDCCH is located. In order to receive a control channel that is transmitted from the base station, since the user equipment cannot know from which location and at which CCE aggregation level or DCI format its own PDCCH is being transmitted, the user equipment monitors the group (or aggregation) of PDCCH candidates within the subframe, thereby being capable of finding its PDCCH. This is referred to as BD (Blind Decoding). Blind decoding may also be referred to as Blind Detection or Blind Search. Blind decoding refers to a method of having the user equipment De-Mask its UE ID at the CRC portion and having the user equipment check the CRC error is order to verify whether or not the corresponding PDCCH is its own control channel.

Hereinafter, uplink retransmission will be described in detail.

The uplink retransmission method may be configured through the above-described PHICH and DCI format 0 (PUSCH scheduling). ACK/NACK is received through the PHICH, so as to perform synchronous non-adaptive retransmission and to perform synchronous adaptive retransmission through DCI format 0. More specifically, both cases only support synchronous retransmission, and the synchronous retransmission indicates that the retransmission should be realized within a given time period after transmitting the first packet.

In case of the non-adaptive retransmission performing retransmission through the PHICH, the non-adaptive retransmission indicates a method of applying the same transmission method in the same frequency resource (PRB) area having transmitted the first packet, and, in case of the adaptive retransmission performing retransmission through DCI format 0, the frequency resource and transmission method may be applied and transmitted in accordance with the corresponding scheduling information. At this point, in case the user equipment simultaneously receives PHICH and PUSCH scheduling, the PHICH is disregarded (or ignored) and a signal is transmitted in accordance with the PUSCH scheduling information. Among the PUSCH scheduling information, in case an NDI (new data indicator) is being toggled, comparison is made with a previous state, and, then, after assuming (or regarding) that the conventional packet transmission is successful, a buffer is flushed. However, even if an ACK is received through the PHICH, if the NDI is not toggled, a buffer of the conventional packet is maintained.

2. Method for Transceiving Downlink Control Information

MTC (Machine-Type Communication) refers to each user equipment performing communication with a base station or multiple user equipments performing communication between one another. An MTC device refers to a user equipment that is designed to perform communication with an MTC server through a PLMN (Public Land Mobile Network) for MTC and/or to perform communication with other MTC device(s). Such MTC device may communicate with MTC server(s) and/or other MTC device(s) and may also locally communicate with another entity, which provides the MTC device with raw data that are to be processed, via wireless (e.g., PAN (Personal Area Network)) communication or hardwired communication.

With the boundary of a single cell, data transmission may be extensively performed through the above-described MTC device, and a variety of devices may be located herein, and, due to the characteristics of each device (e.g., refrigerator, washing machine, mobile phone, TV, notebook, and so on), the cycle (or duration) of data transmission and the amount (or size) of data transmission may each be configured in different formats.

The performance and standard of the MTC supported by an LTE/LTE-A system will be described as follows.

1) Feasibility of a low cost MTC that can compete with a GSM (Global System for Mobile communications)/GPRS (General Packet Radio Service) MTC user equipments Data rate respective to E-GPRS (Enhanced General Packet Radio Service): downlink (118.4 Kbps), uplink (59.2 Kbps)

Spectrum efficiency: sufficiently enhanced spectrum efficiency for a low data rate of MTC traffic Service Coverage: Same LTE cell coverage (General LTE user equipments should be applied to low cost MTC user equipments.)

Power consumption: Not degraded as compared to the conventional GSM/GPRS based MTC devices Minimized legacy influence: co-existence of wireless frequency between a legacy LTE wireless interface and a network (e.g., Release-8, 9), operation of a low cost MTC user equipment and a legacy LTE user equipment within the same carrier, re-usage of the conventional LTE/SAE (System Architecture Evolution) network architecture 2) Evaluation Aspects Reduction in RF component cost: support of /bands/RATs (Radio Access. Technologies)/RF chains/antenna ports, transmission power, maximum channel bandwidth, half-duplex FDD mode Reduction of processing within device: support of sufficiently low peak data rate, no support of uplink/downlink spatial processing mode, reduced wireless protocol processing The essential element of an LTE/LTE-A system based low cost MTC device relates to reducing the fabrication cost as much as possible, while showing a performance equivalent to or greater than that of a GPRS/E-GPRS based device, which corresponds to the conventional GSM based MTC method. In order to fabricate a device with low fabrication cost, it is important to simplify the signal that is being received, in order to simplify and omit the decoding/demodulation procedure, and it is also important to reduce the procedure for detecting signals and the power that is being consumed for such procedure, in order to reduce power consumption of the device and to reduce the size of the battery.

As a solution for reducing the cost of the above-described low cost MTC device, one of the most frequently discussed criteria corresponds to reducing the maximum bandwidth to a bandwidth that is narrower than the conventional 20 MHz bandwidth, which is used in the LTE system. In this case, the size of multiple components may be reduced as compared to the conventional MTE modem chip. However, problems may occur in the reception of diverse signals of the downlink control channel (PDCCH). Therefore, in order to reduce the maximum bandwidth of a low cost MTC device, a solution for efficiently receiving signals of a downlink control channel even in a reduced bandwidth is being required. Additionally, since the low cost MTC device should also be operated along with the conventional LTE system, the above-described solution should also be applied to devices of the conventional LTE/LTE-A system. Hereinafter, the present invention defines transmission channels that are applied to the low cost MTC device, in order to simplify hardware (H/W) of LTE/LTE-A based low cost MTC device, and in order to reduce power consumption.

As described above in FIG. 4, the downlink control channel (PDCCH) of the conventional LTE/LTE-A system (Release-8/9/10) is located in the earliest 1~3 symbols of the downlink physical resource block.

In this case, since the control information that is being transmitted through the downlink control channel is transmitted through the entire frequency domain, in case the device has a maximum bandwidth that is smaller than 20 MHz, the reception of the control information may be impossible. However, a separate device (e.g., a specific interleaver) that can allow such reception to be possible may be required. Additionally, even if the reception of the control information is made possible in the device having a maximum bandwidth that is smaller than 20 MHz by using the above-described separate device, in order to allow the corresponding device to co-exist with the conventional LTE/

LTE-A user equipment, since load is inevitably applied to the scheduling of the base station, a complicated certification procedure is being required.

As a solution for resolving such problem, the downlink control channel of the low cost MTC device may be set up as described below. For simplicity in the description, the low cost MTC device will hereinafter be collectively referred to as an 'MTC device'. Nevertheless, the present invention will not be limited only to the devices for the MTC.

2. 1. Downlink Control Channel Configuration for MTC User Equipment

The physical downlink control channel (PDCCH), which is transmitted for the MTC user equipment, may be transmitted by using a physical downlink shared channel (PDSCH) region. More specifically, the MTC user equipment does not use the legacy PDCCH, and all downlink transmission (control information and data) is performed (or transmitted) through the PDSCH region.

First of all, the physical downlink control channel of the MTC user equipment may be located in the physical downlink shared channel by using a time division duplex method (TDD), or the physical downlink control channel of the MTC user equipment may be located in the physical downlink shared channel by using a frequency division duplex method (FDD) or a time-frequency complex division method (TDD-FDD). At this point, the physical downlink control channel for the MTC user equipment may be located in the physical downlink shared channel region, which is located within the maximum frequency bandwidth of the MTC user equipment.

Additionally, the physical downlink control channel of the MTC user equipment may be multiplexed with data in the dame physical resource block (PRB) and may then be transmitted. More specifically, the physical downlink control channel of the MTC user equipment may be multiplexed with downlink data within the same physical resource block (PRB) as the physical downlink shared channel, which is allocated for the MTC user equipment, and may then be transmitted. In other words, as in the uplink, the method of having the user equipment multiplex and transmit uplink control information in the same PRB as the physical uplink shared channel (PUSCH), when resource for the physical uplink shared channel (PUSCH) is being allocated, may be identically applied herein.

Furthermore, the physical downlink control channel of the MTC user equipment may be transmitted by using an e-PDDCH (enhanced PDCCH) based on Release-11 of an LTE/LTE-A system. Herein, the e-PDDCH refers to a control channel, which is newly defined for the Release-11 based user equipment, and the e-PDCCH may be multiplexed with downlink data and may then be transmitted.

As described above, in case the physical downlink control channel of the MTC user equipment is defined within the physical downlink shared channel, and in case the downlink control information is being transmitted through the physical downlink control channel of the MTC user equipment, limitations in the reference signal (RS), which is used by the MTC user equipment during the process of receiving/decoding downlink control information may be eliminated. More specifically, although it was mandatory to use a CRS (common RS) during the process of receiving/decoding downlink control information, which is transmitted from the legacy PDCCH, in case the physical downlink control channel is defined within the physical downlink shared channel, and in case the downlink control information is being transmitted from the physical downlink shared channel, the MTC user equipment may receive/decode the downlink control information by using the DMRS. Accordingly, as described above, in case the physical downlink control channel for the MTC user equipment is defined within the physical downlink shared channel, and in case the downlink control information is transmitted through the physical downlink control channel for the MTC user equipment, the following methods may be used.

1) In case the physical downlink control channel for the MTC user equipment is defined within the physical downlink shared channel, and in case the downlink control information is transmitted through the physical downlink control channel for the MTC user equipment, the downlink control information may be transmitted/received based upon a CRS. More specifically, the user equipment may use the CRS during the process of receiving/decoding the common control information.

2) In case the physical downlink control channel for the MTC user equipment is defined within the physical downlink shared channel, and in case the downlink control information is transmitted through the physical downlink control channel for the MTC user equipment, the downlink control information may be transmitted/received based upon a DMRS. More specifically, the user equipment may use the DMRS during the process of receiving/decoding the common control information.

As described above, whether or not a downlink control channel for the MRC user equipment is being transmitted based upon a CRS or based upon a DMRS may be determined in advance between the MTC user equipment and the base station, and the base station may notify the corresponding information to the MTC user equipment.

2. 2. Definition of a CSS for an MTC User Equipment

Among downlink control information, CCI (common control information) is transmitted through a CSS (Common Search Space), and the CSS consists of the first 16 resource units (CCE) of a downlink control channel region. More specifically, the CSS consists of a total of 16 consecutive CCEs starting from a CCE having the lowest index. Therefore, if the CSS is located only in a legacy PDCCH region, and in case of a user equipment that can accommodate a bandwidth that is lower than the maximum bandwidth of 20 MHz, it may be impossible to receive the common control information (CCI). In order to resolve this problem, the CSS for the MTC user equipment may be newly defined in the PDSCH region.

1) The CSS for the MTC user equipment may be defined in the PDSCH region based upon the CRS. More specifically, the user equipment may use the CRS during the process of receiving/decoding the common control information.

2) The CSS for the MTC user equipment may be defined in the PDSCH region based upon the DMRS. More specifically, the user equipment may use the DMRS during the process of receiving/decoding the common control information.

As described above, whether or not a downlink control channel for the MRC user equipment is being transmitted based upon a CRS or based upon a DMRS may be determined in advance between the MTC user equipment and the base station, and the base station may notify the corresponding information to the MTC user equipment.

3) The CSS for the MTC user equipment may be defined in a resource of the PDSCH region as described below, and the common control information may be transmitted through the PDCCH, which mapped to the CSS being defined in the PDSCH region. Additionally, as a CSS for the MTC user equipment, a CSS for a user equipment using an e-PDCCH (e.g., a Release-11 based user equipment) may be shared and used.

2. 2. 1. Definition of a CSS in a First Slot within Each Subframe

In order to prevent decoding delay of the common control information from occurring, or in order to reduce decoding delay of the common control information, the CSS being defined within the PDSCH may be defined in within the first slot.

Additionally, in order to prevent the point of departure of the CSS according to the definition of the legacy PDCCH from being different from one another, the CSS being defined within the PDSCH may be mapped to the first slot as described below. This is to receive/decode the common control information as swiftly as possible, so as to reduce decoding delay that is being required for the decoding of the whole data. Additionally, this is also to avoid collision with a PBCH, which is being transmitted to 6RB based upon a DC subcarrier (or central frequency of a channel bandwidth) of a second slot.

1) The CSS may be mapped to a first slot of 16RB based upon a DC subcarrier for the MTC user equipment. However, if the number of RBs is smaller than 16RB, the CSS may be mapped to the first slot of each of the given RBs. More specifically, in case the maximum bandwidth of the user equipment is smaller than 16RB, the CSS may be mapped to all RBs corresponding to the maximum bandwidth of the user equipment within the first slot.

2) In description 1), the number of symbols having the CSS mapped thereto may correspond to 4 symbols located at the very last portion within the time axis regardless of the variability of a symbol mapped to the legacy PDCCH (e.g., 1 symbol to 3 symbols).

Figure 15:
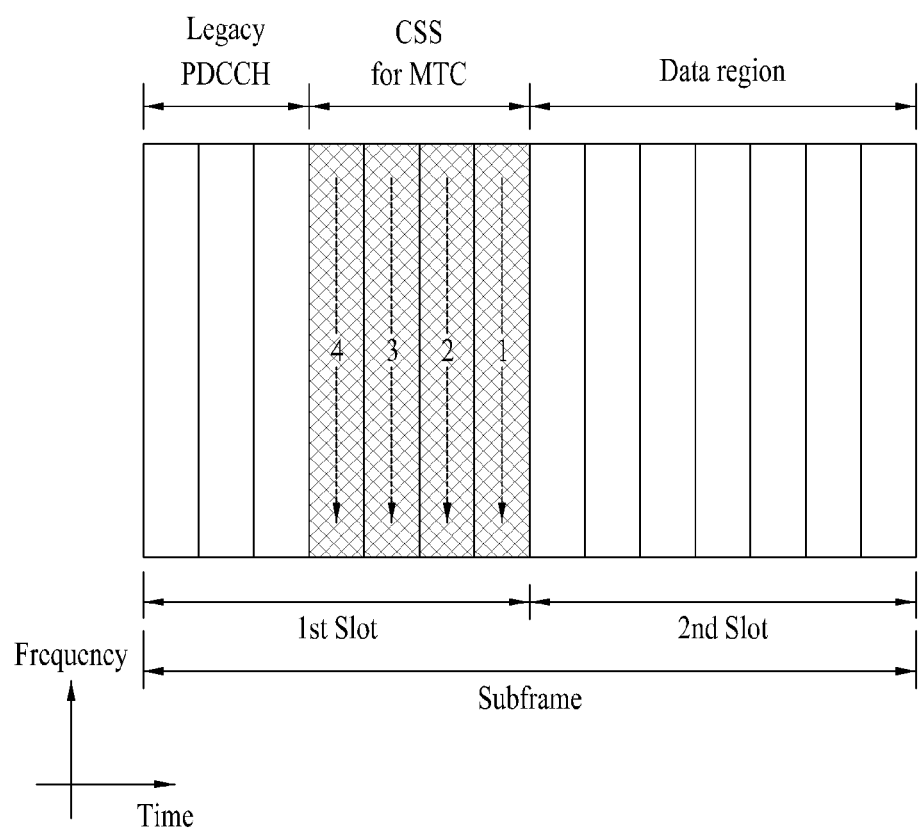
FIG. 15 illustrates an exemplary method of mapping a CSS to a legacy PDSCH region according to an exemplary embodiment of the present invention.

FIG. 15 illustrates an exemplary method of mapping a CSS to a legacy PDSCH region according to an exemplary embodiment of the present invention. In the drawing, arrows indicate the mapping direction of the common control information.

Referring to FIG. 15, in order to map the CSS regardless of the size (or number of symbols) of a legacy PDCCH, the common control information may be mapped to the CSS by using a frequency first mapping method starting from the last symbol (symbol number 6) of the first slot and up to the fourth symbol (symbol number 3) of the first slot. More specifically, after the common control information is mapped to the last symbol (symbol number 6) of the first slot, the mapping of the common control information may be performed in an order starting from mapping the common control information to the second last symbol (symbol number 5) and up to mapping the common control information to the fourth symbol (symbol number 3) of the first slot.

Figure 16:
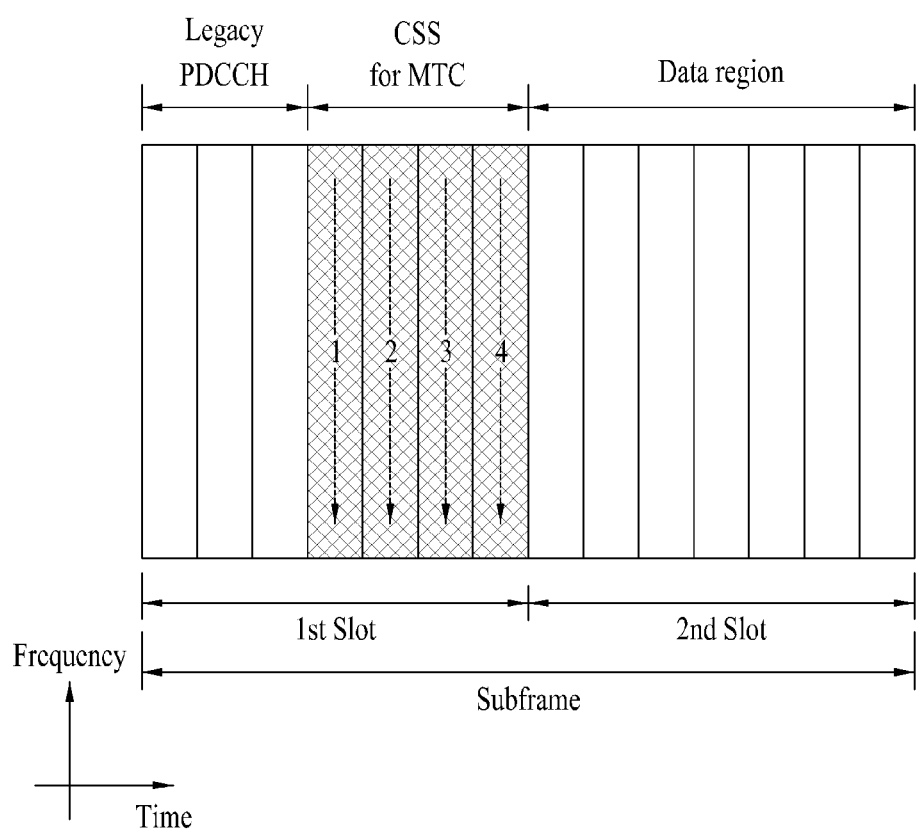
FIG. 16 illustrates an exemplary method of mapping a CSS to a legacy PDSCH region according to an exemplary embodiment of the present invention.

FIG. 16 illustrates an exemplary method of mapping a CSS to a legacy PDSCH region according to an exemplary embodiment of the present invention. In the drawing, arrows indicate the mapping direction of the common control information.

Referring to FIG. 16, in order to map the CSS regardless of the size (or number of symbols) of a legacy PDCCH, the common control information may be mapped to the CSS by using a frequency first mapping method starting from the fourth symbol (symbol number 3) of the first slot and up to the last symbol (symbol number 6) of the first slot. More specifically, after the common control information is mapped to the fourth symbol (symbol number 3) of the first slot, the mapping of the common control information may be performed in an order starting from mapping the common control information to the next symbol (symbol number 4) and up to mapping the common control information to the last symbol (symbol number 6) of the first slot.

3) In description 1), the number of symbols having the CSS mapped thereto may correspond to the remaining number of symbols of the first slot excluding the symbol mapped to the legacy PDCCH. For example, if the symbol mapped to the legacy PDCCH corresponds to symbol number 0, the number of symbols may correspond to the remaining symbol number 1~symbol number 6 of the first slot, if the symbols mapped to the legacy PDCCH correspond to symbol number 0 and symbol number 1, the number of symbols may correspond to the remaining symbol number 2~symbol number 6 of the first slot, and if the symbols mapped to the legacy PDCCH correspond to symbol number 0, symbol number 1, and symbol number 2, the number of symbols may correspond to the remaining symbol number 3~symbol number 6 of the first slot.

Figure 17:
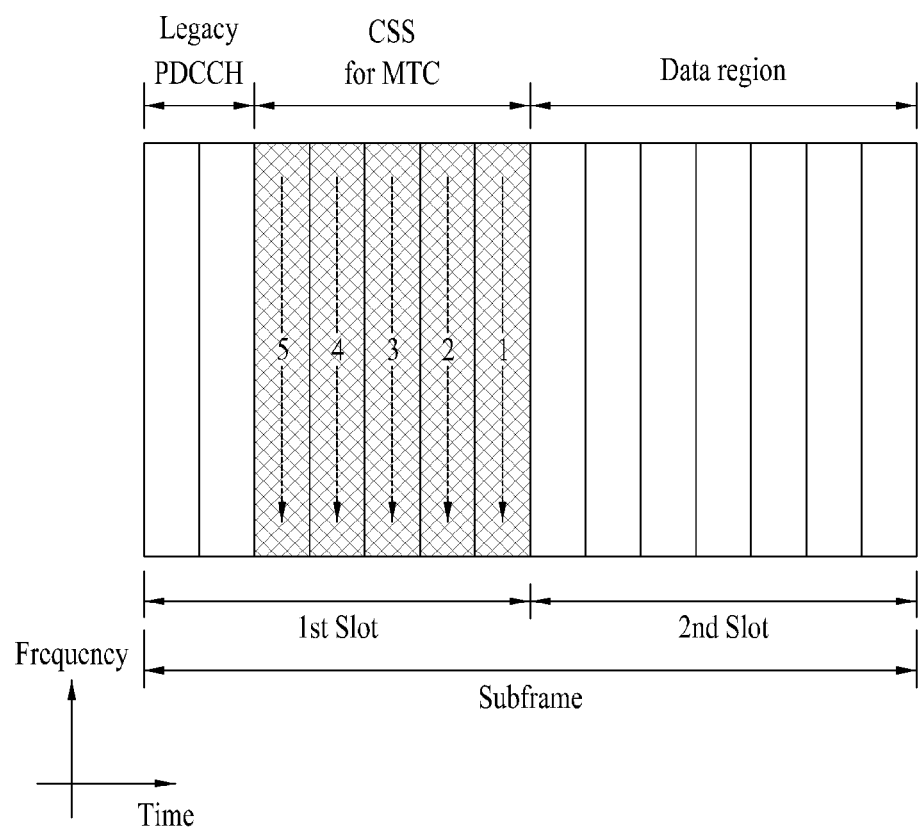
FIG. 17 illustrates an exemplary method of mapping a CSS to a legacy PDSCH region according to an exemplary embodiment of the present invention.

FIG. 17 illustrates an exemplary method of mapping a CSS to a legacy PDSCH region according to an exemplary embodiment of the present invention. In the drawing, arrows indicate the mapping direction of the common control information.

Referring to FIG. 17, in order to map the CSS regardless of the size (or number of symbols) of a legacy PDCCH, the common control information may be mapped to the CSS by using a frequency first mapping method starting from the last symbol (symbol number 6) of the first slot and up to the third symbol (symbol number 2) of the first slot. More specifically, after the common control information is mapped to the last symbol (symbol number 6) of the first slot, the mapping of the common control information may be performed in an order starting from mapping the common control information to the second last symbol (symbol number 5) and up to mapping the common control information to the third symbol (symbol number 2) of the first slot. Herein, the MTC user equipment may check for the CRC added to the common control information, which is mapped to each symbol, and, then, the MTC user equipment may determine whether or not the common control information is continued (or whether or not the common control information is finished) based upon the existence or absence of the CRC. The MTC user equipment verifies the presence or absence of the CRC in the last symbol (symbol number 6) of the first slot, and, then, if the CRC is not detected, the MTC user equipment verifies the presence or absence of the CRC in the second last symbol of the first slot, and, then, if the CRC is not detected, the presence or absence of the CRC in the third last symbol of the first slot, and, in this order of verification, the MTC user equipment may verify the mapped section of the common control information. More specifically, the MTC user equipment may verify the presence or absence of the CRC in the same order as the order of mapping the common control information, which is performed by the base station.

Figure 18:
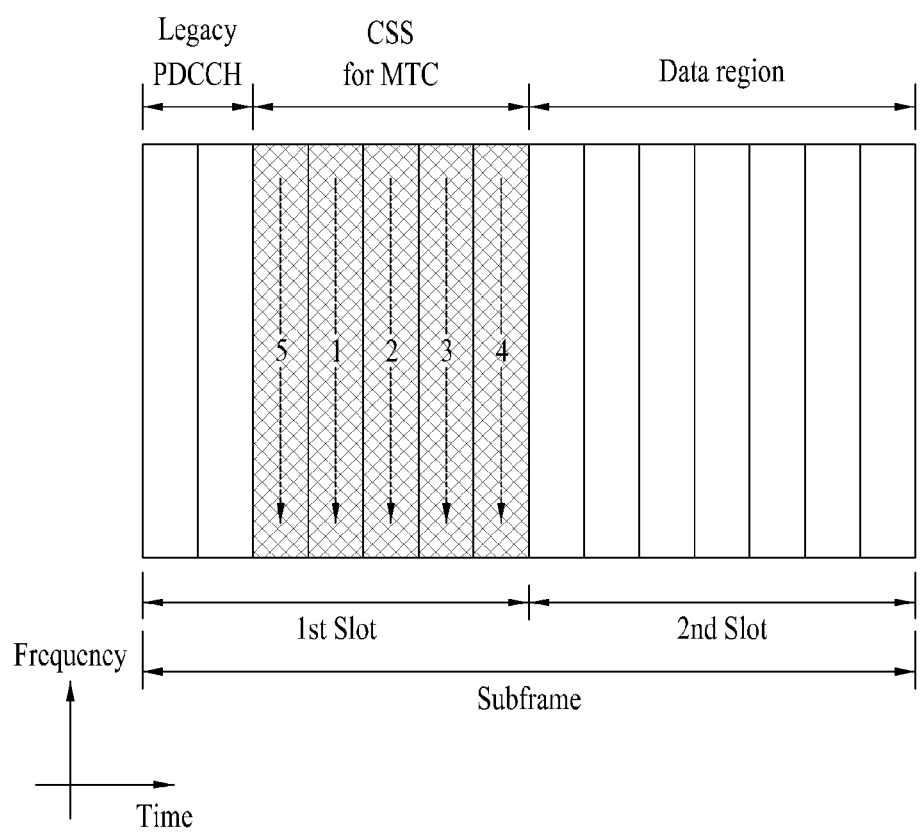
FIG. 18 illustrates an exemplary method of mapping a CSS to a legacy PDSCH region according to an exemplary embodiment of the present invention.

FIG. 18 illustrates an exemplary method of mapping a CSS to a legacy PDSCH region according to an exemplary embodiment of the present invention. In the drawing, arrows indicate the mapping direction of the common control information.

Referring to FIG. 18, in order to map the CSS regardless of the size (or number of symbols) of a legacy PDCCH, the common control information may be mapped to the CSS by using a frequency first mapping method starting from the fourth symbol (symbol number 3) of the first slot and up to the last symbol (symbol number 6) of the first slot, and, then, after completing the mapping process by mapping the common control information up to the last symbol (symbol number 6) of the first slot, in case more common control information that is to be transmitted exists, the corresponding common control information may be mapped to symbols located after the legacy PDCCH. More specifically, after the common control information is mapped to the fourth symbol (symbol number 3) of the first slot, the mapping of the common control information may be performed in an order starting from mapping the common control information to the next symbol (symbol number 4) and up to mapping the common control information to the last symbol (symbol number 6) of the first slot, and, then, after the common control information is mapped to the last symbol (symbol number 6) of the first slot, the common control information may be mapped to the third symbol (symbol number 2) of the first slot. And, in this case, also, the MTC user equipment may check for the CRC added to the common control information, which is mapped to each symbol, and, then, the MTC user equipment may determine whether or not the common control information is continued (or whether or not the common control information is finished) based upon the existence or absence of the CRC.

Meanwhile, although FIG. 18 shows an example of the legacy PDDCH being mapped up to the second (symbol number 1), the same principle may be identically applied to a case when the legacy PDCCH is mapped up to the first (symbol number 0). More specifically, after the common control information is mapped to the last symbol (symbol number 6) of the first slot, the common control information may be mapped in a mapping order of being mapped to the second symbol (symbol number 1) of the first slot and, then, being mapped to the third symbol (symbol number 2) of the first slot.

Figure 19:
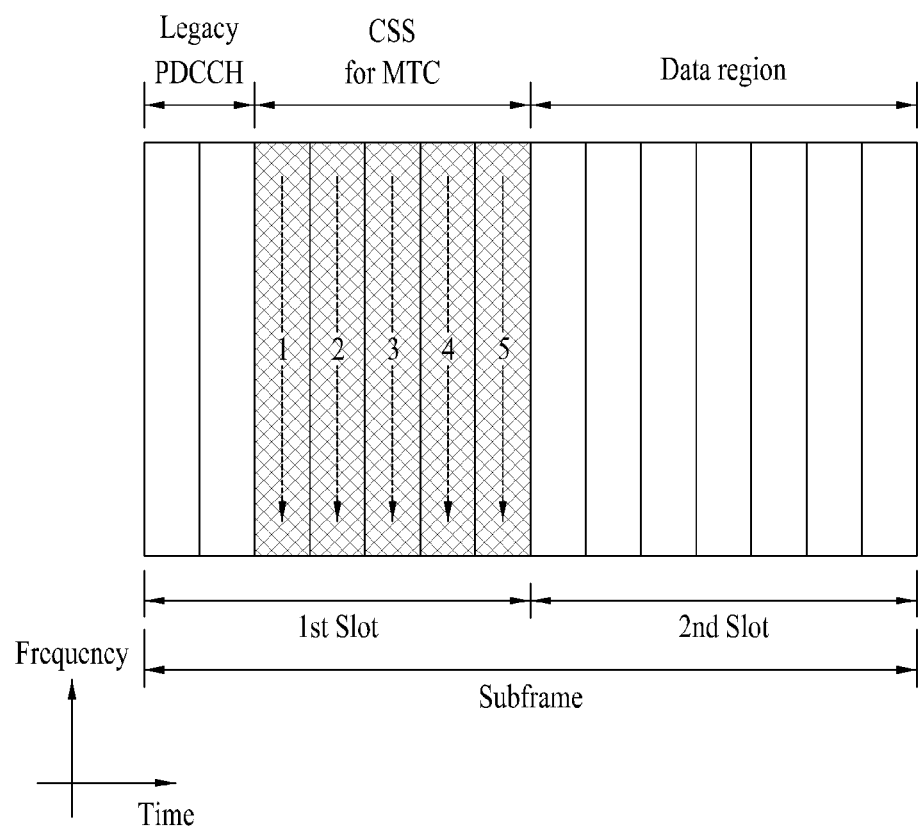
FIG. 19 illustrates an exemplary method of mapping a CSS to a legacy PDSCH region according to an exemplary embodiment of the present invention.

FIG. 19 illustrates an exemplary method of mapping a CSS to a legacy PDSCH region according to an exemplary embodiment of the present invention. In the drawing, arrows indicate the mapping direction of the common control information.

Referring to FIG. 19, in order to map the CSS regardless of the size (or number of symbols) of a legacy PDCCH, the common control information may be mapped to the CSS by using a frequency first mapping method starting from the next symbol of the symbol to which the legacy PDCCH is mapped and up to the last symbol (symbol number 6) of the first slot. As shown in FIG. 19, in case the legacy PDCCH is being mapped up to the second symbol (symbol number 1) of the first slot, after the common control information is mapped to the third symbol (symbol number 2) of the first slot, the mapping of the common control information may be performed in an order starting from mapping the common control information to the third symbol (symbol number 3) and up to mapping the common control information to the last symbol (symbol number 6) of the first slot. Herein, the MTC user equipment may verify the position of the CDD for the MTC user equipment by using information on the number of symbols, which are used in order to perform legacy PDCCH transmission through the PCFICH. And, also, in this case, the MTC user equipment may check for the CRC added to the common control information, which is mapped to each symbol, and, then, the MTC user equipment may determine whether or not the common control information is continued (or whether or not the common control information is finished) based upon the existence or absence of the CRC.

Meanwhile, although FIG. 19 shows an example of the legacy PDDCH being mapped up to the second (symbol number 1), the same principle may be identically applied to a case when the legacy PDCCH is mapped up to the first (symbol number 0). More specifically, the common control information may be mapped in a mapping order starting from being mapped to the second symbol (symbol number 1) of the first slot and up to being mapped to the last symbol (symbol number 6) of the first slot.

4) In description 2) or 3), the common control information (or PDCCH) being mapped to the CSS may be mapped in CCE or RB units, and, after being processed with symbol wise interleaving (or symbol unit interleaving), the processed common control information may be mapped to the CSS. For example, the common control information may be mapped in 4 or 8 CCE units or RB units.

2. 2. 2. Definition a CSS in all Slots within Each Subframe

The CSS may be mapped to all slots of multiple consecutive RBs based upon a DC subcarrier for the MTC user equipment. More specifically, a CSS may be defined in all slot pairs configuring a subframe. Herein, the method described above in (2. 2. 1) may be identically applied as the method of mapping the CSS in the first slot. Additionally, after mapping the CSS within all first slots of the multiple consecutive RBs based upon a DC subcarrier for the MTC user equipment, the CSS may also be mapped to the second slot, and, then, the CSS may be sequentially mapped to all slots for each of the multiple consecutive RBs based upon the subcarrier.

1) In case a PBCH exists, the CSS for the MTC user equipment may be mapped to sections within all slots of 10 RBs based upon the DC subcarrier excluding the section in which the PBCH exists.

2) In case a PBCH does not exist, the CSS for the MTC user equipment may be mapped to all slots of 6 RBs based upon the DC subcarrier.

3) In description 1) or 2), the starting point of the CSS may be fixed to a specific symbol, and the specific symbol may correspond to a next symbol of the symbol to which the legacy PDCCH is mapped.

Also, in this case, as described above, the MTC user equipment may check for the CRC added to the common control information, which is mapped to each symbol, and, then, the MTC user equipment may determine whether or not the common control information is continued (or whether or not the common control information is finished) based upon the existence or absence of the CRC.

Furthermore, the common control information (or PDCCH) being mapped to the CSS may be mapped in CCE or RB units, and, after being processed with symbol wise interleaving (or symbol unit interleaving), the processed common control information may be mapped to the CSS. For example, the common control information may be mapped in 4 or 8 CCE units or RB units.

2. 2. 3. Control Information for an MTC User Equipment

In case the CSS for the MTC user equipment is defined as described above, in addition to the conventional common control information, the following types of control information may be added to the CSS for the MTC user equipment.

Since the user equipment of the current LTE/LTE-A system is capable of transmitting data for each subframe, in case of an FDD system, a NACK is generated in a subframe, which is transmitted from the base station, and data respective to a total of 8 subframes are transmitted to the base station until the data having the NACK generated therein are retransmitted to the base station. More specifically, as provision against the generation of an NACK, the user equipment should be provided with a buffer for storing the data of the 8 subframes.

In order to reduce the size of the above-described buffer in the MTC user equipment, the MTC user equipment does not transmit data at each subframe, and, instead, the MTC user equipment may transmit data in accordance with a decided cycle. Accordingly, HARQ processing number or duration (or transmission cycle) of the MTC user equipment may be added to the common control information. For example, within the duration of 8 subframes, data may be transmitted for each subframe having an even-numbered index (subframes 0, 2, 4, 6), and, in this case, the number of subframes required to store data as provision against the generation of NACK within the MTC user equipment may be reduced to 4 subframes. Additionally, within the 8 subframe duration, if data are transmitted at each $0^{th}$ and $4^{th}$ subframes, the number of subframes required to store data as provision against the generation of NACK within the MTC user equipment may be reduced to 2 subframes, and, within the 8 subframe duration, if data are transmitted at each $0^{th}$ subframe, the number of subframes required to store data as provision against the generation of NACK within the MTC user equipment may be reduced to 1 subframe. In this case, with respect to the MTC user equipment within the cell, the base station may add a duration (or cycle) corresponding to the subframe, from which data are intended to be transmitted, and/or a number (or index) of the subframe transmitting data (or a number of the subframe respective to a data transmission starting point) to the common control information in the CSS.

2. 3. Limitation in the Downlink Control Information Transmission Method

In case of the MTC user equipment, if a CSS and a USS (UE-specific Search Space) exist separately, or if localized resource allocation and distributed resource allocation both exist separately, blind decoding complexity within the MTC user equipment and related power consumption may be increased, and, by having diverse decoding modules equipped therein, the fabrication cost may also be increased. And, therefore, limitations may be defined with respect to the downlink control information transmission as described below.

1) In case of the MTC user equipment, based upon the DC subcarrier, the control channel may be defined in a bandwidth that is smaller than the system bandwidth (e.g., 20 MHz). For example, in order to perform decoding of the conventional LTE synchronization signal (e.g., PSS (Primary Synchronization Signal) or SSS (Secondary Synchronization Signal)) and PBCH, the control channel may be defined within a bandwidth of 1.4 MHz. Additionally, as described above, based upon the DC subcarrier, limitations may be set to 16RB, 10RB or 6RB, and so on.

2) In case of the MTC user equipment, the PDSCH may be newly designed in the PDSCH region. For example, the control channel may be defined in the PDSCH region by using the methods described above in (2. 1.) or (2. 2.) and, then, downlink control information may be transmitted through the PDSCH region. At this point, in order to reduce blind decoding complexity in the MTC user equipment, instead of separately setting up regions for the USS and the CSS, regions for the USS and the CSS may be commonly set up, so that the MTC user equipment can simultaneously perform blind decoding with respect to the USS and the CSS within the set up common region.

3) In case of the MTC user equipment, the control channel may be designed only in the distributed mode. More specifically, multiple logical channels may be set up in the distributed mode within a common resource, and, in case of the USS, a UE-specific ID, e.g., C-RNTI (Cell-RNTI) may be masked with the CRC, and, in case of the CSS, a cell-specific ID may be masked with the CRC.

4) Just as in the case when the common control information for the MTC user equipments is not changed, the CSS for the MTC user equipments may not be required in all subframes. In this case, the base station may transmit set-up (or configuration) information (e.g., CSS set-up duration (or cycle)) respective to a subframe or wireless frame (or radio frame) having the CSS for the MTC user equipments defined therein to an MTC user equipment via higher layer signaling (e.g., RRC (Radio Resource Control) signaling).

5) The PDCCH transmission for the MTC user equipment may be limited to MBSFN (Multicast-Broadcast Single Frequency Network) subframes. In case of an MBSFN subframe, since the CRS is not transmitted, when designing a PDCCH channel for the MTC user equipment, the design may be carried out without taking the CRS into consideration. In this case, the MTC user equipment may use an MBSFN reference signal (MBSFN RS) during a process of receiving/decoding downlink control information.

6) Instead of being applied to the MIMO, the PDCCH transmission for the MTC user equipment may be limited to a rank 1 transmission.

2. 4. PDSCH Resource Allocation

As described above, in case of limiting the maximum bandwidth of the MTC user equipment, and in case of newly designing the control channel in the PDSCH region, resource for the PDSCH transmission may be largely insufficient. Additionally, an MTC traffic pattern may be periodic, and, as compared to downlink traffic, uplink traffic may be relatively larger. Based upon such MTC characteristics, the following configurations may be made.

1) One PDCCH may designate diverse resource allocation. More specifically, a PDCCH may designate a PDSCH allocation cycle. For example, by designating a PDSCH resource allocation cycle to the MTC user equipment in subframe units, the base station may allocate the resource of multiple PDSCHs.

2) One PDCCH may designate diverse resource allocation. More specifically, a PDCCH may designate a PUSCH resource allocation cycle. For example, by designating a PUSCH resource allocation cycle to the MTC user equipment in subframe units, the base station may allocate the resource of multiple PUSCHs.

Additionally, information on starting from how long after the PDDCH transmission point the PUSCH is to be additionally allocated may be notified through the PDCCH. For example, the base station may transmit an offset (k) value to the MTC user equipment through the PDCCH, which is being transmitted from an $n^{th}$ subframe, and the MTC user equipment may transmit uplink data to the base station in accordance with the resource allocation cycle starting from an n+k subframe.

3) One PDCCH may designate all resource allocation respective to the PDSCH and the PUSCH. More specifically, since patterns related to the transmission of the PDSCH and PUSCH may be defined in accordance with traffic patterns of the MTC, this may be notified in advance via separate signaling (e.g., RRC signaling) or may be transmitted through the PDCCH. At this point, the corresponding pattern may be set up by directly applying an HARQ process rule without any modification.

4) By allocating a group ID (group Identifier) to MTC user equipments in order to reduce the control information for the MTC user equipments, and by masking the group ID in the CRC, signaling overhead that is caused by CRC masking may be reduced. Additionally, the differentiation (or identification) of users/user equipments within the same group may be notified to the user equipment by the base station via RRC signaling or may be scrambled by using a user/user equipment specific sequence. More specifically, if the group ID is masked with the CRC, the user equipment belonging to the corresponding group may be capable of verifying the control information respective to the group to which the corresponding user equipment belongs, and, by using the information that is received via RRC signaling, the user equipment may be capable of identifying its own control information, or by using its own unique sequence, the user equipment may be capable of identifying its own control information.

For simplicity in the description of the above-described resource allocation method of the CSS for the MTC user equipment, although the MTC user equipment is given as an example, the above-described method may also be identically applied to a CSS design of an e-PDCCH for a future user equipment (user equipment after Release-11) of the LTE/LTE-A system or to a CSS design for a user equipment using the e-PDCCH.

4. General Description of a Device to which the Present Invention May be Applied FIG. 20 illustrates a block view showing a structure of a wireless communication device according to an exemplary embodiment of the present invention.

Figure 20:
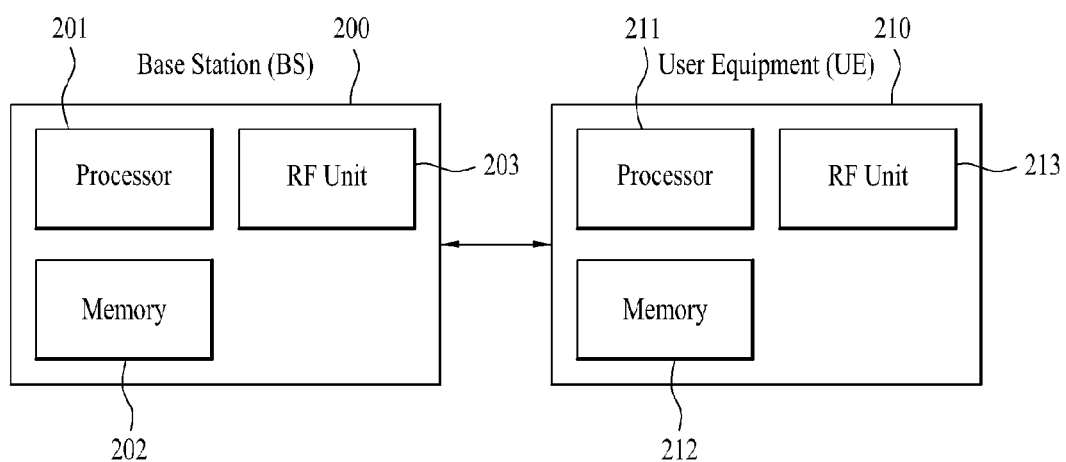
FIG. 20 illustrates a block view of a structure of a wireless communication device according to an exemplary embodiment of the present invention.

Referring to FIG. 20, a wireless communication device includes a base station (200) and multiple user equipments (210) located within the base station (200) area.

The base station (200) includes a processor (201), a memory (202), and an RF module (203). The processor (201) realizes the proposed functions, procedures, and/or methods. Layer of the wireless interface protocol may be realized by the processor (201). The memory (202) is connected to the processor (201) and stores diverse information for operating the processor (201). The RF unit (203) is connected to the processor (201) and transmits and/or receives radio signals.

The user equipment (210) includes a processor (211), a memory (212), and an RF module (213). The processor (211) realizes the proposed functions, procedures, and/or methods. Layer of the wireless interface protocol may be realized by the processor (211). The memory (212) is connected to the processor (211) and stores diverse information for operating the processor (211). The RF unit (213) is connected to the processor (211) and transmits and/or receives radio signals.

The memory (202, 212) may be provided inside or outside of the processor (201, 211) and may be connected to the processor (201, 211) through diverse well-known means. Furthermore, the base station (200) and/or the user equipment (200) may have a single antenna or multiple antennae.

The above-described embodiments of the present invention correspond to predetermined combinations of elements and features and characteristics of the present invention. Moreover, unless mentioned otherwise, the characteristics of the present invention may be considered as optional features of the present invention. Herein, each element or characteristic of the present invention may also be operated or performed without being combined with other elements or characteristics of the present invention. Alternatively, the embodiment of the present invention may be realized by combining some of the elements and/or characteristics of the present invention. Additionally, the order of operations described according to the embodiment of the present invention may be varied. Furthermore, part of the configuration or characteristics of any one specific embodiment of the present invention may also be included in (or shared by) another embodiment of the present invention, or part of the configuration or characteristics of any one embodiment of the present invention may replace the respective configuration or characteristics of another embodiment of the present invention. Furthermore, it is apparent that claims that do not have any explicit citations within the scope of the claims of the present invention may either be combined to configure another embodiment of the present invention, or new claims may be added during the amendment of the present invention after the filing for the patent application of the present invention.

The above-described embodiments of the present invention may be implemented by using a variety of methods. For example, the embodiments of the present invention may be implemented in the form of hardware, firmware, or software, or in a combination of hardware, firmware, and/or software. In case of implementing the embodiments of the present invention in the form of hardware, the method according to the embodiments of the present invention may be implemented by using at least one of ASICs (Application Specific Integrated Circuits), DSPs (Digital Signal Processors), DSPDs (Digital Signal Processing Devices), PLDs (Programmable Logic Devices), FPGAs (Field Programmable Gate Arrays), processors, controllers, micro controllers, micro processors, and so on.

In case of implementing the embodiments of the present invention in the form of firmware or software, the method according to the embodiments of the present invention may be implemented in the form of a module, procedure, or function performing the above-described functions or operations. A software code may be stored in a memory unit and driven by a processor. Herein, the memory may be located inside or outside of the processor, and the memory unit may transmit and receive data to and from the processor by using a wide range of methods that have already been disclosed.

The present invention may be realized in another concrete configuration (or formation) without deviating from the scope and spirit of the essential characteristics of the present invention. Therefore, in all aspect, the detailed description of present invention is intended to be understood and interpreted as an exemplary embodiment of the present invention without limitation. The scope of the present invention shall be decided based upon a reasonable interpretation of the appended claims of the present invention and shall come within the scope of the appended claims and their equivalents. Therefore, it is intended that the present invention covers the modifications and variations of this invention provided they come within the scope of the appended claims and their equivalents, and it is not intended to limit the present invention only to the examples presented herein.

INDUSTRIAL APPLICABILITY

Although a method for transmitting data in a wireless communication system of the present invention is described based upon an example that can be applied to a 3GPP LTE system, the method of the present invention may also be applied to a variety of other radio access system in addition to the 3GPP LTE system.

What is claimed is:

1. A method for transmitting DCI (Downlink Control Information) in a machine type communication (MTC) system, the method comprising:
    mapping a PDCCH (Physical Downlink Control Channel) to a CSS (Common Search Space) in a descending order on a frequency axis by using a frequency first mapping method, wherein the CSS is defined in a first slot of a PDSCH (Physical Downlink Shared Channel) region; and transmitting the DCI to a user equipment through the mapped PDCCH, wherein the PDCCH is mapped in a descending order on a time axis starting from a last symbol of the first slot, and wherein a CRC (Cyclic Redundancy Check) of the PDCCH is added at an end of the PDCCH to indicate a last symbol of the CSS.

2. The method of claim 1, wherein the CSS is defined in last 4 symbols of the first slot or in a symbol located after a legacy PDCCH (legacy Physical Downlink Control Channel) region up to the last symbol of the first slot.

3. The method of claim 1, wherein the DCI is transmitted based upon a CRS (Common Reference Signal) or a DMRS (Demodulation Reference Signal).

4. The method of claim 1, wherein the PDCCH is mapped in CCE (Control Channel Element) units or RB (Resource Block) units.

5. The method of claim 1, wherein the DCI includes information on uplink data transmission duration.

6. The method of claim 1, wherein the DCI simultaneously designates multiple PDSCH resources or multiple PUSCH (Physical Uplink Shared Channel) resources.

7. The method of claim 1, wherein the DCI is CRC (Cyclic Redundancy Check) masked by using a group identifier, wherein the group identifier is allocated to a user equipment group including multiple groups.

8. A method for receiving DCI (Downlink Control Information) in a machine type communication (MTC), the method comprising:

receiving the DCI through a PDCCH (Physical Downlink Control Channel), wherein the PDCCH is mapped to a CSS (Common Search Space) in a descending order on a frequency axis by using a frequency first mapping method, wherein the CSS is defined in a first slot of a PDSCH (Physical Downlink Shared Channel) region, wherein the PDCCH is mapped in a descending order on a time axis starting from a last symbol of the first slot, and wherein a CRC (Cyclic Redundancy Check) of the PDCCH is added at an end of the PDCCH to indicate a last symbol of the CSS.

9. The method of claim 8, wherein the CSS is defined in last 4 symbols of the first slot or in a symbol located after a legacy PDCCH (legacy Physical Downlink Control Channel) region up to the last symbol of the first slot.

10. The method of claim 8, wherein the DCI is transmitted based upon a CRS (Common Reference Signal) or a DMRS (Demodulation Reference Signal).

11. The method of claim 8, wherein the PDCCH is mapped in CCE (Control Channel Element) units or RB (Resource Block) units.

12. The method of claim 8, wherein the DCI includes information on uplink data transmission duration.

13. The method of claim 8, wherein the DCI simultaneously designates multiple PDSCH resources or multiple PUSCH (Physical Uplink Shared Channel) resources.

14. The method of claim 8, wherein the DCI is CRC (Cyclic Redundancy Check) masked by using a group identifier, wherein the group identifier is allocated to a user equipment group including multiple groups.

15. A base station configured to transmit DCI (Downlink Control Information) in a machine type communication (MTC), the base station comprising:

an RF (Radio Frequency) unit configured to transceiver radio signals; and a processor configured to map a PDCCH (Physical Downlink Control Channel) to a CSS (Common Search Space) in a descending order on a frequency axis by using a frequency first mapping method, wherein the CSS is defined in a first slot of a PDSCH (Physical Downlink Shared Channel) region, and to transmit the DCI to a user equipment through the mapped PDCCH, wherein the PDCCH is mapped in a descending order on a time axis starting from a last symbol of the first slot, and wherein a CRC (Cyclic Redundancy Check) of the PDCCH is added at an end of the PDCCH to indicate a last symbol of the CSS.

16. A user equipment configured to receive DCI (Downlink Control Information) in a machine type communication, the user equipment comprising:

an RF (Radio Frequency) unit configured to transceiver radio signals; and a processor configured to receive the DCI through a PDCCH (Physical Downlink Control Channel), wherein the PDCCH is mapped to a CSS (Common Search Space) in a descending order on a frequency axis by using a frequency first mapping method, wherein the CSS is defined in a first slot of a PDSCH (Physical Downlink Shared Channel) region, wherein the PDCCH is mapped in a descending order on a time axis starting from a last symbol of the first slot, and wherein a CRC (Cyclic Redundancy Check) of the PDCCH is added at an end of the PDCCH to indicate a last symbol of the CSS.

* * * * *